(12) United States Patent
Fitzgerald

(10) Patent No.: US 10,441,908 B2
(45) Date of Patent: Oct. 15, 2019

(54) FILTER ASSEMBLY WITH SELF-CONTAINED DISPOSABLE FILTER CARTRIDGE

(71) Applicant: David E. Fitzgerald, Scottsdale, AZ (US)

(72) Inventor: David E. Fitzgerald, Scottsdale, AZ (US)

( * ) Notice: Subject to any disclaimer, the term of this patent is extended or adjusted under 35 U.S.C. 154(b) by 0 days.

(21) Appl. No.: 15/681,203

(22) Filed: Aug. 18, 2017

(65) Prior Publication Data

US 2019/0054402 A1 Feb. 21, 2019

(51) Int. Cl.
*B01D 35/30* (2006.01)
*B01D 27/08* (2006.01)
(Continued)

(52) U.S. Cl.
CPC ........... *B01D 35/301* (2013.01); *B01D 27/02* (2013.01); *B01D 27/08* (2013.01); *B01D 27/103* (2013.01); *B01D 29/15* (2013.01); *B01D 29/17* (2013.01); *B01D 35/30* (2013.01); *B01D 35/303* (2013.01); *B01D 61/00* (2013.01); *B01D 63/00* (2013.01); *B01D 2201/291* (2013.01); *B01D 2201/302* (2013.01); *B01D 2201/303* (2013.01); *B01D 2201/304* (2013.01); *B01D 2201/308* (2013.01);
(Continued)

(58) Field of Classification Search
CPC .. B01D 35/303; B01D 35/306; B01D 35/308; B01D 2201/291; B01D 2201/307; B01D 2201/308; B01D 2201/309; B01D 2201/4092; B01D 29/15; B01D 29/96; B01D 29/31; B01D 29/33; B01D 29/114; B01D 35/301; B01D 35/30; B01D 63/00; B01D 61/00; B01D 29/17; B01D 27/08; B01D 27/02; B01D 27/103; B01D 2201/347; B01D 2201/4076; B01D 2201/342; B01D 2201/303; B01D 2201/4015; B01D 2201/302; B01D 2201/304

See application file for complete search history.

(56) References Cited

U.S. PATENT DOCUMENTS 1,874,976 A * 8/1932 Hans .................. B01D 27/00
184/6.24
4,690,621 A * 9/1987 Swain .................. B01D 29/114
417/313
(Continued)

*Primary Examiner* — David C Mellon
(74) *Attorney, Agent, or Firm* — Bycer Law, PLC; Matthew L. Bycer

(57) ABSTRACT

A filtering device includes a two-piece housing and a disposable, self-contained filter cartridge. The filter cartridge includes a cylindrical filter with a specialized flow bypass endcap, and possibly a second differentiated endcap, wherein each endcap is coupled to opposing ends of the cylindrical filter. The flow bypass endcap includes two channels for the passage of fluids, one channel for the ingress of pre-filtered fluid another channel for egress of filtrate. The bottom endcap can block fluid flow into the end of the cylindrical filter. The filter cartridge includes an impermeable bladder which may be coupled to the outer surface of each endcap such that the bladder completely encloses the filter media. Fluid entering the system passes through ingress channel of the flow bypass endcap into bladder (which surrounds the filter and isolates the fluid from the filter housing).

29 Claims, 33 Drawing Sheets

(51) Int. Cl.
- *B01D 27/02* (2006.01)
- *B01D 27/10* (2006.01)
- *B01D 29/15* (2006.01)
- *B01D 29/17* (2006.01)
- *B01D 61/00* (2006.01)
- *B01D 63/00* (2006.01)

(52) U.S. Cl.
CPC .. *B01D 2201/342* (2013.01); *B01D 2201/347* (2013.01); *B01D 2201/4015* (2013.01); *B01D 2201/4076* (2013.01)

(56) References Cited

U.S. PATENT DOCUMENTS

| | | | |
|---|---|---|---|
| 4,711,717 A * | 12/1987 | Wolf | B01D 35/30 210/137 |
| 5,066,391 A * | 11/1991 | Faria | B01D 29/15 210/85 |
| 5,076,315 A | 12/1991 | King | |
| 5,139,686 A * | 8/1992 | Cares | B01D 29/15 210/232 |
| 5,258,128 A * | 11/1993 | Gerteis | B01D 29/114 210/236 |
| 5,707,518 A | 1/1998 | Coates et al. | |
| 5,866,001 A | 2/1999 | Hlebovy | |
| 5,914,037 A | 6/1999 | Yen | |
| 6,485,641 B1 * | 11/2002 | McLeod | B01D 27/06 210/198.1 |
| 6,632,355 B2 | 10/2003 | Fritze | |
| 9,126,129 B2 | 9/2015 | Sakraschinsky et al. | |
| 9,469,551 B2 | 10/2016 | Sherman et al. | |
| 2004/0124127 A1 * | 7/2004 | Fox | B01D 29/15 210/167.12 |
| 2005/0067342 A1 * | 3/2005 | Bassett | B01D 27/08 210/418 |
| 2013/0186815 A1 * | 7/2013 | Cupit | B01D 29/15 210/232 |

* cited by examiner

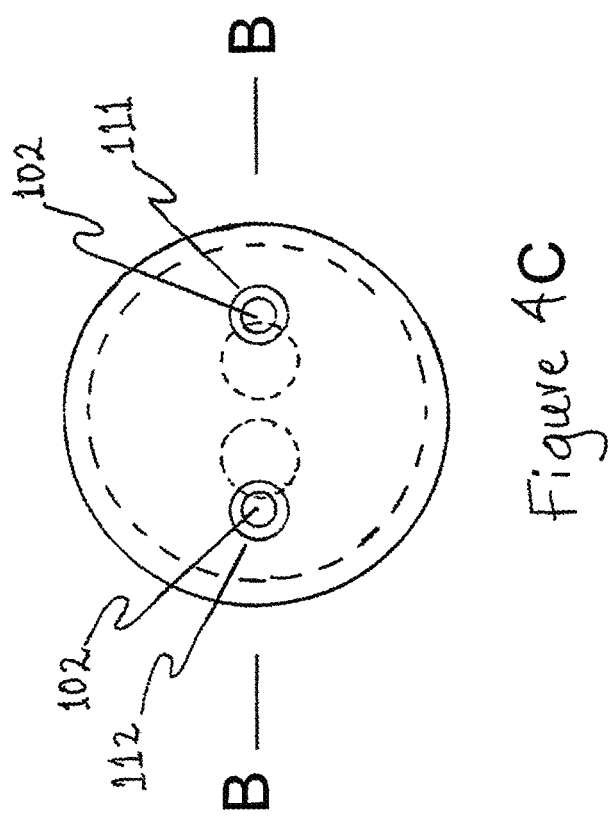

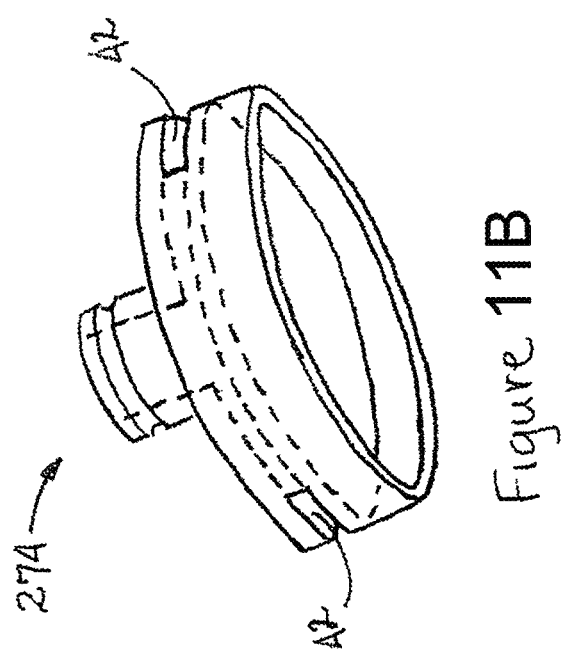

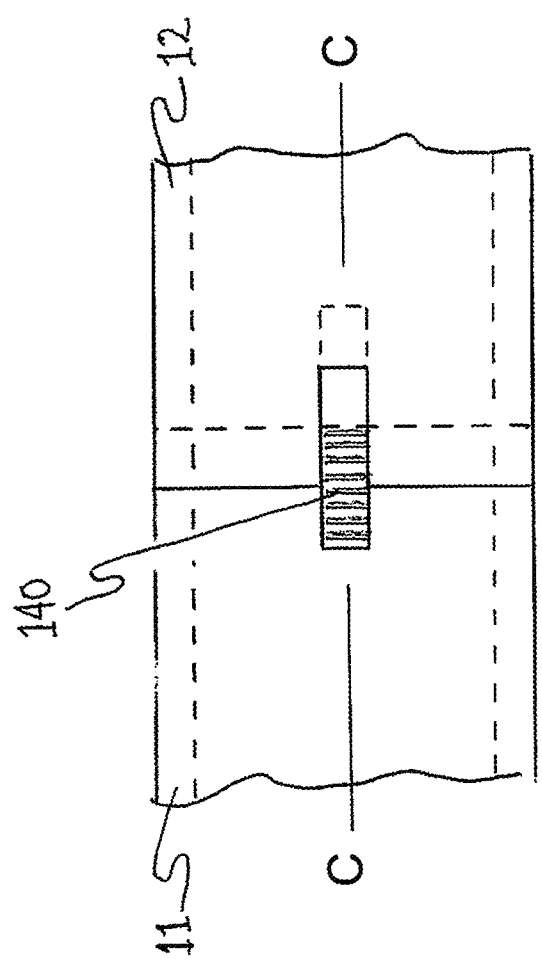

FILTER ASSEMBLY WITH SELF-CONTAINED DISPOSABLE FILTER CARTRIDGE

BACKGROUND OF THE INVENTION

1. Field of the Invention

The present invention, relates to filtration of liquids and gases. More particularly, the present invention relates to self-contained fluid treatment assembly and replaceable bladder filter assemblies.

2. Description of Prior Art

Disposable, point of use, fluid filters are widely available to meet the needs and desires of consumers, including under-the-sink and water filters for refrigerators. Point of use filters can be separated into two main categories; 1) one-piece, sealed filters, and 2) filters with a reusable, two-piece housing and disposable inner filter cartridge. Both of these filter types have disadvantages:

(a) The housings of the one piece, sealed filters are typically comprised of non-biodegradable plastic materials and can be 50% or more of the weight of the entire, filter assembly. When one piece, sealed filters are replaced at the end of their useful life, the entire filter assembly is discarded, generating a significant amount of environmentally unfriendly waste.

(b) One-piece, sealed filters are more expensive, typically twice the price, than replacement filter cartridges and therefore have a higher operating cost for the same amount of filtration.

Filters with a reusable, two-piece housing and replaceable inner fitter cartridge provide a less expensive and more environmentally friendly alternative to the one-piece filter design, but are not as popular among filter users due to the inconvenient exchange process for filter cartridges. As shown in FIGS. 1A and 1B, the design of these filters allows the inner surface of the filter bringing to be directly exposed to pre-filtered fluids. Therefore, when the filter cartridge requires replacement, the user must take precautions and additional actions to deal with, spillage of the residual fluid remaining in the filter housing when it is opened, especially if the pre-filtered fluid contains undesirable contaminants.

(c) Users must use tooling or wear protective gear, such as gloves, to avoid contact with the prefiltered fluid when opening the filter housing or when removing the used filter from the housing.

(d) Users must open the two-piece filter housing in an appropriate area, such as over a sink or bucket, in order to contain the spillage of the fluid from the filter housing.

(e) Users also have to clean the fluid spillage on the outer surface of the filter housing prior to reuse of the filter, (f) Users may also have to clean and maintain, the interior surface of the casing as it is exposed to water and develops biofilms.

(g) Certain existing two-piece filters require an o-ring between the two halves of the filter housing to maintain a fluid tight seal. These o-rings require on-going, periodic replacement during the lifetime of the filter.

Therefore, it is a primary object of the present invention to provide for a fluid treatment system that allows for modular replacement of the treatment medium.

It is another object of the present invention to provide for a water fluid treatment system including a bladder to isolate the interior portions of a fluid treatment medium casing.

It is as yet a further object of the present invention is to provide a separable fluid treatment medium casing to allow access to a treatment medium for replacement.

It is a further object of the present invention is to provide for a sanitary fluid filtration system with replaceable treatment medium.

These and other objects of the present invention will become apparent to those skilled in the art as the description thereof proceeds.

SUMMARY OF THE INVENTION

The present invention is directed to a fluid treatment housing system with onboard fluid treatment unit, such as a filter or other type of treatment. The housing system may include an entry path and an exit path so allow for fluids to enter and exit the system respectively. A treatment medium (or media) contained within the treatment housing system provides filtration or treatment as fluids pass either through or around the treatment medium. Untreated fluid entering the system untreated passes through the filter and exits system through an aperture as filtrate. The housing system includes a casing to house the treatment medium. Preferably at least two apertures will be included in the casing, one to allow entrance and one to allow exit of fluids. In an alternative embodiment, the treatment casing/housing will include an least three apertures, one for entrance of untreated fluids, one for exit of treated fluids, and a third for exit of waste water/brine/untreated concentrate/discharge/effluent (such as in the example of a reverse osmosis device). The casing may include an upper body and a lower body that can be fastened to one another through various means and unfastened to allow for access to the interior including the treatment medium. A bladder may be disposed within the casing containing the treatment medium to allow for isolation of fluid from portions of the interior surface of the casing and modular replacement of the treatment medium with bladder. The bladder will have at least one aperture allowing for fluid to ingress and egress system. The bladder may include one (or more) aperture(s), such as a first aperture above the filter, or along the entrance pathway of fluid entering the filter or bladder assembly. The bladder may be affixed to the top endcap via fastener, O-ring pressure, or otherwise adhered thereto. A second aperture may be included at the bottom of the treatment medium to provide for the complimentary joining with either a bottom endcap or the bottom of the casing. Typically, adhesives and/or sealing structures, such as O-rings for gaskets, will provide for connection of the materials and otherwise seal and direct fluid movement in the system. The fluid filter housing system may include a flow bypass endcap. A preferred embodiment utilizes a flow bypass endcap coupled to the filter, directly or indirectly. For instance, the filter may be immediately adjacent the endcap, or there may be another feature, such as an O-ring, bladder portion, etc. situated therebetween. The flow bypass endcap may serve to direct the flow of fluid within the system and couple the filter with casing directly or indirectly, with gaskets or the like, bladder or the like, affixed therebetween. Preferably, the flow bypass endcap will include a central channel to allow for fluid to exit (alternatively to enter) the system. Further apertures in the flow bypass endcap, such as side (diversion) channels, may be used to allow fluid to flow in the opposite direction as through the central channel. It is contemplated that fluid entering the system will be directed into an aperture of the flow bypass endear. Once passing through the flow bypass endcap, the fluid will be contained within the bladder until exiting the treatment medium cartridge via the endcap and subsequently exiting the casing either for delivery of treated fluids or disposal of effluent. The flow bypass endcap may be used to couple an end of the treatment media with the casing. An additional, optional, bottom endcap may be used to couple the second opposing end of the treatment medium, and such bottom endcap may also be used to mate (and locate) complimentary with the lower body of the casing. The casing may include one aperture to allow fluid to enter and a second aperture to allow fluid to exit along the upper body of the easing. The entry and exit apertures in the casing may be provided side-by-side or one concentric within the other. Alternatively, a single or more apertures may be included on one end, such as the upper body, while at least one other aperture would be included on the lower body. This formation is preferable when effluent is discharged along with a delivery of treated fluids. It is contemplated that the fluid treatment housing system will be used to treat potable or un potable water and deliver potable water. Alternatively, fluids may include any gas or liquid suitable for use with any treatment medium.

The casing upper and lower body may be fastened to one another through various means, such as through threaded fittings, bayonet fittings, tab fastener, or the like. It is contemplated that the upper and lower bodies of the casing may be releasably fastened to one another to allow for closing of the system and reopening of the system to access and replace the modular treatment medium or media. The casing is preferably one that can be reused with multiple treatment media replacements. The fluid treatment housing is contemplated to be applied in conjunction with an appliance, such as a refrigerator or icemaker, a point-of-use water treatment system, or any instance in which clean, quick exchange of fluid treatment media is preferred.

The present invention also includes a fluid treatment system with a casing providing structural support and access to the fluid. The casing may also provide for exit of fluid. A bladder is preferably included within the casing disposed around the treatment media. The bladder serves to isolate the interior surface of the casing from the fluid, both treated and untreated. The bladder may provide for a modular replacement of the treatment medium and bladder within the casing, and for reuse of the casing with a new modular treatment media cartridge and/or bladder contained filtration unit. A flow bypass endcap may serve to join the treatment medium with the easing, preferably along at least one aperture in the casing to provide access of the treatment medium to incoming untreated water and/or fluid. Flow may be directed through side channels or directly/indirectly downward. Filters or media useful in the present fluid treatment (also filtration) system may be particulate filter, carbon filter, reverse osmosis filter, or other filter known in the art. Preferably the modular unit may be removed from the casing without exposing the interior surface of the casing to the fluid.

The present invention also includes the method fix providing treatment of the fluid through a modular treatment system. The fluid enters into the modular fluid filtration system and passes through an aperture in the casing directly into the bladder. Within the bladder, the fluid is treated as it passes through some treatment medium or media within the bladder. Treated fluid is delivered from the bladder and out of the casing. The step of passing may also include passing fluid into the modular treatment system into the casing through an endcap to the treatment medium, whereby the fluid may pass first the casing then the bladder then the endcap, or first the casing then the endcap and then the bladder. The bladder may also ensure than an interior surface of the casing is isolated from the fluid. The modular treatment system may include replacement of be bladder and filter in a single modular unit. The casing may be opened to access the modular unit, a replacement modular bladder and treatment media may be placed within the easing, and then the easing may be reclosed.

BRIEF DESCRIPTION OF THE DRAWINGS

The present invention will be described with greater specificity and clarity with reference to the following drawings, in which:

FIG. 4C illustrates a top view of the dual port casing of the embodiment shown in FIG. 4A.

FIG. 11B shows an alternative perspective view of a single bypass endcap an embodiment of the present invention.

FIG. 14B illustrates a side view of the locking mechanism as shown in FIG. 14A.

DETAILED DESCRIPTION OF THE PREFERRED EMBODIMENTS

A filtering or treatment device includes a two-piece housing and a disposable, self-contained filter cartridge. The upper housing and lower housing pieces many be mechanically coupled to enclose the filter/treatment cartridge within the housing. The upper and lower housing pieces may also be mechanically separated to allow access for removal and replacement of the treatment/filter cartridge. The treatment medium (e.g. cartridge, isolated, etc.) is coupled to the housing by an O-ring connection. The filter cartridge includes a cylindrical filter with a specialized flow bypass endcap, and possibly a second differentiated endcap, wherein each endcap is coupled to opposing ends of the cylindrical filter. The flow bypass endcap includes two channels for the passage of fluids, one channel for the ingress of pre-filtered fluid another channel for egress of filtrate from the treatment cartridge. The bottom endcap can block fluid flow into the end of the cylindrical treatment medium. The treatment cartridge includes an impermeable bladder coupled to the outer surface of each endcap such that the bladder completely encloses the treatment media. A fluid entering the treatment housing flows directly into the cartridge. The fluid passes through the ingress channel of the flow bypass endcap into bladder (which surrounds the treatment medium and isolates the fluid from the housing). The fluid is filtered as it flows through the cylindrical media. The filtrate exits the treatment cartridge through the egress channel in the flow bypass endcap and subsequently exits the housing.

In accordance with one embodiment a treatment assembly comprises a two-piece, openable housing and a self-contained, replaceable treatment cartridge assembly. Treatment assembly may be encapsulated (but for aperture) in a bladder. Accordingly several advantages of one, or more aspects are as follows: to provide a fluid treatment that reduces environmental waste, that provides users with a less expensive operating cost, that allows for fast and convenient replacement of lifter cartridges and does not require replacement of O-rings on the filter housing to maintain a fluid seal. Other advantages of one or more aspects will be apparent from a consideration of the drawings and ensuing description.

Figure 1A:
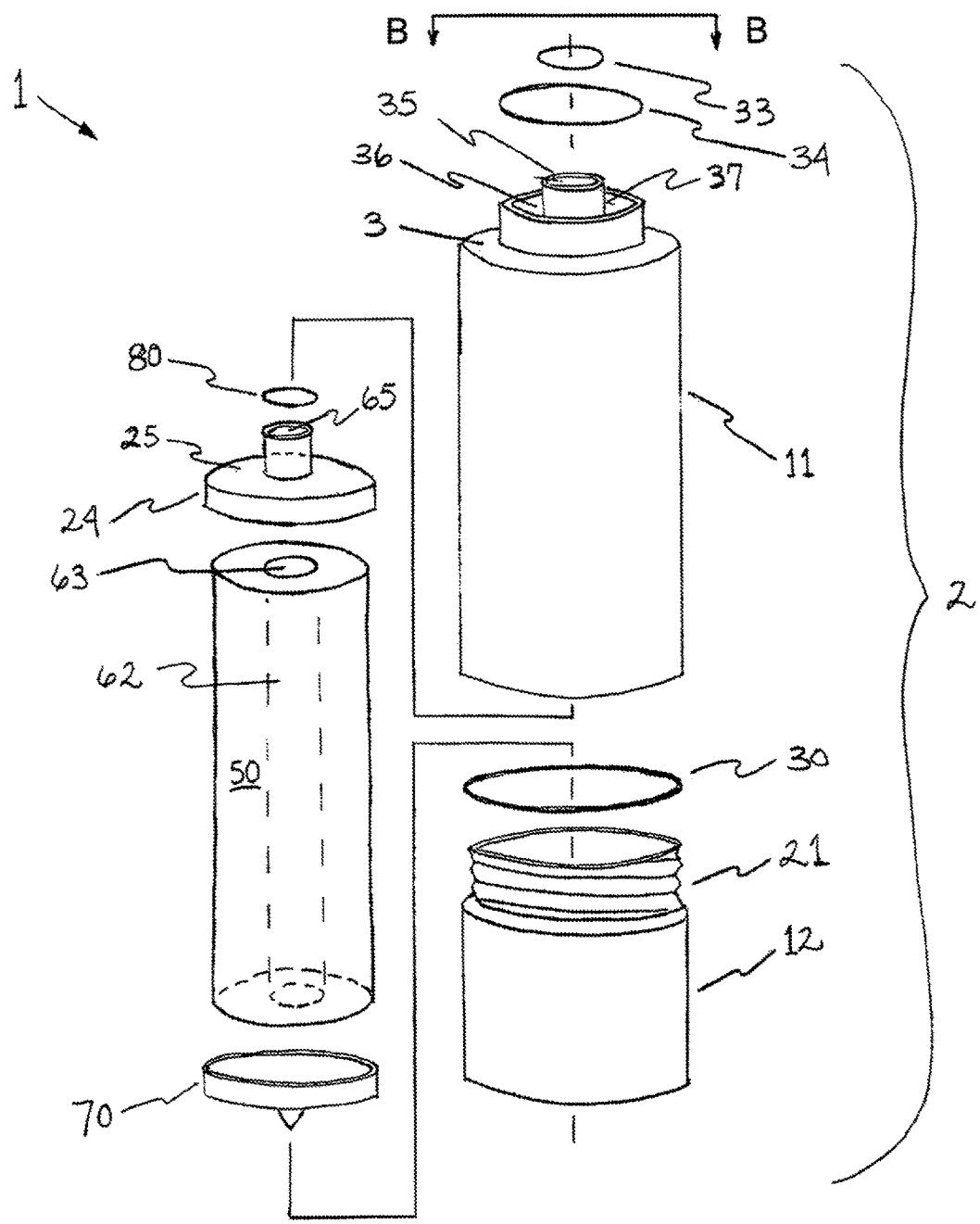
FIG. 1A illustrates an exploded view of a 2-piece filter with a disposable filter cartridge in accordance with prior art.
Figure 1B:
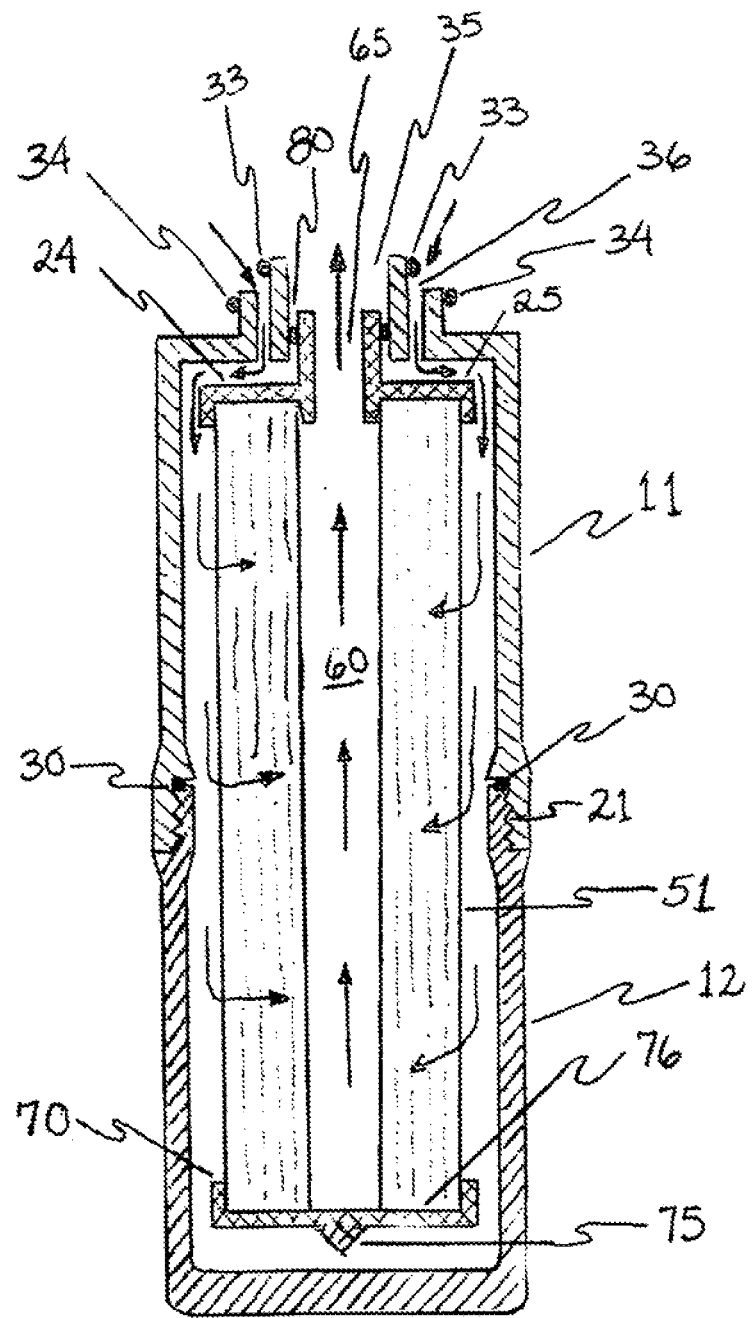
FIG. 1B illustrates a cross-sectional view, including the fluid flow path through the device, along line B-B' of the embodiment shown in FIG. 1A.

Referring to the prior art as shown in FIGS. 1A and 1B such as a treatment medium unit used in a refrigerator water delivery system, a housing assembly is included with casing 2 with a top concentric dual port housing as an upper body 11 and a bottom housing as a lower body 12. Threading 21 may be used to connect the upper and lower bodies 11 and 12 together, with an optional mid housing O-ring 30. Top surface 3 includes concentric apertures, interior 35 and exterior 36. Wherein concentric apertures 35 and 36 found between interior and exterior concentric walls 37 and 38 are used along the top surface 3 of upper body 11. First and second concentric O-rings 33 and 34 (small and large) may be used to seal the casing into a water source (not shown). Single flow endcap O-ring 80 may be provided over a single flow standard endcap 24 to allow for water to divert along an endcap top surface 25 of endcap 24 around treatment medium 50 whereby water will be forced through treatment medium 50 into center column 62 and out through center exit port 63 back through endcap exit port 65. Bottom endcap 70 may be included to hold treatment medium and/or center treatment medium 50 within casing housing 2.

As can be seen in FIG. 1B, fluid flow path is demonstrated via arrows. Prior art systems 1 include entry through an outer concentric aperture 36 around wind the treatment medium 50 and fluid (such as water) will percolate through the treatment medium 50 into the hollow center 60 (here shown as a center column) and powered preferably via incoming fluid pressure. Fluid then exits endcap exit channel 65 through interior concentric aperture 35.

Referring again to FIGS. 1A and 1B, upper body 11 fits over lower body 12 and is adapted to mate via threading 21. Mid housing O-ring 30 sits between upper body 11 and lower body 12 to provide for a seal. Inside the easing 2 is found endcap 24, along with hollow cylindrical treatment medium 50 and bottom endcap 70. Treatment medium 50 is preferably selected from one in more of three standard filtration methods (particulate, absorption, or reverse osmosis) as is known in the art, or otherwise as may be applicable to a replaceable filtration system. Filtration may be mechanical, such as the particulate filter, absorption, such as activated carbon, or reverse osmosis, as in membranes. Pass of fluid by treatment medium 50, or a related component coupled or integrated therewith, as is known in the art, may also be used to return or supplement minerals or other additives to the fluid filtrate. It is contemplated that the fluid a may be water for potable drinking purposes wherein the treatment medium removes unwanted carried or dissolved components, however, this system can be used with the numerous different fluids both liquid and gas to remove and/or add components to the fluid. Preferably, treatment medium is capped on both ends b endcap 24 and lower endcap 70. Lower endcap 70 may meet treatment medium via lower endcap surface 76. On the opposite side of the lower endcap surface 76, surface pin 75 may be included to provide for centering or ease of placement relative lower body 12. It is contemplated that treatment medium 30 will include a hollow center 60 whereby fluid enters around the outside treatment medium surface 51 of treatment medium 50 and percolates or permeates, or otherwise makes its way, into hollow center 60. Fluid enters system through exterior aperture 36 flowing past top surface 25 of bypass endcap 24, then over and around treatment medium 50. Fluid enters through treatment medium 50 through outside surface 51 into hollow center 60, and proceeds to exit through bypass endcap exit channel (or aperture) 65, and then exit system 1 through casing interior aperture 35.

The above discussion of FIGS. 1A-1B are intended to illustrate the basic structure of a system, and the reference numerals referred therein may be assumed or repeated with minor alteration in the various alternative embodiments of the present invention. Further discussion of the preferred embodiments of the present invention are herein described with detail specifically noting the many differences from the prior art systems.

Figure 2A:
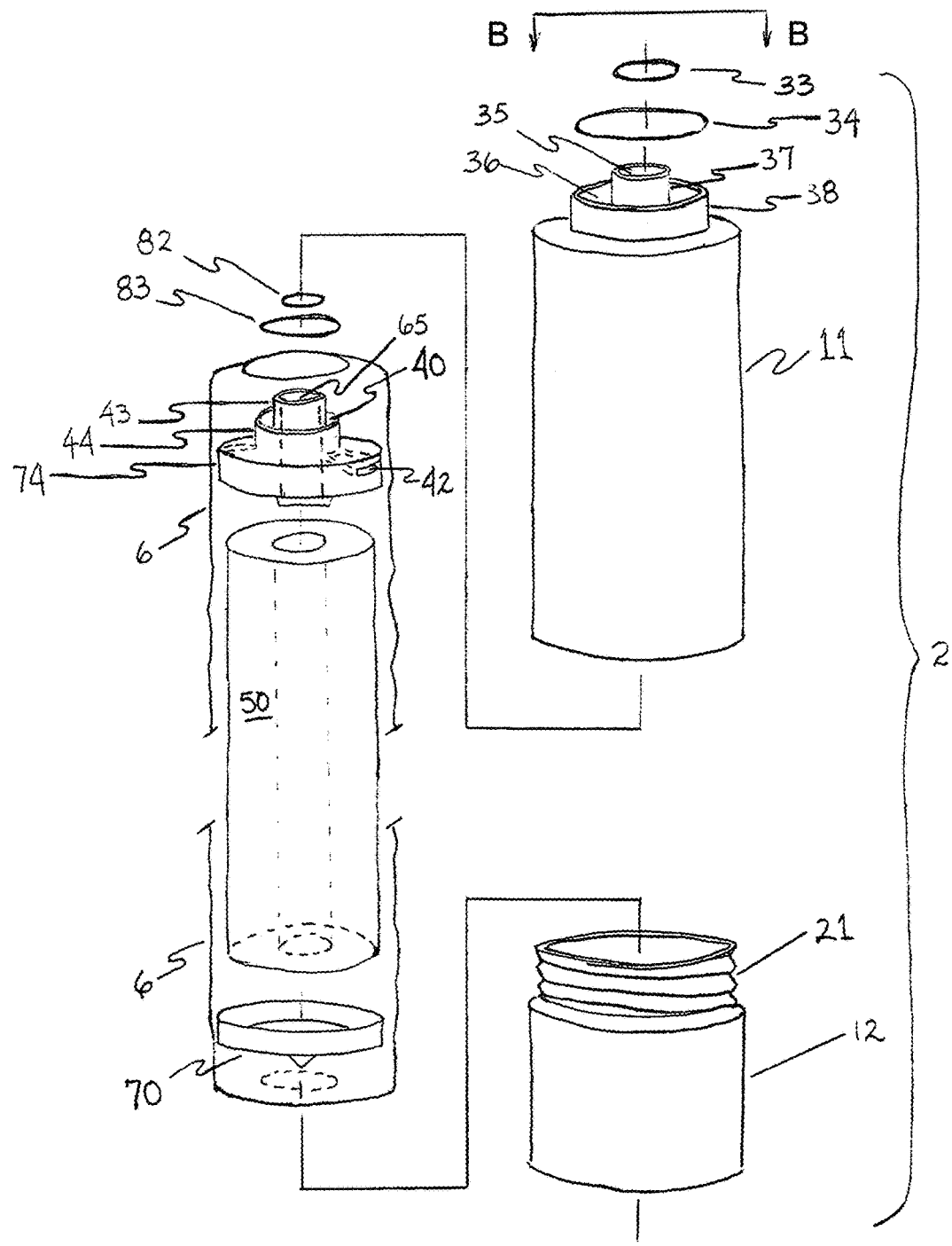
FIG. 2A illustrates an exploded view of an embodiment of the present invention.
Figure 2B:
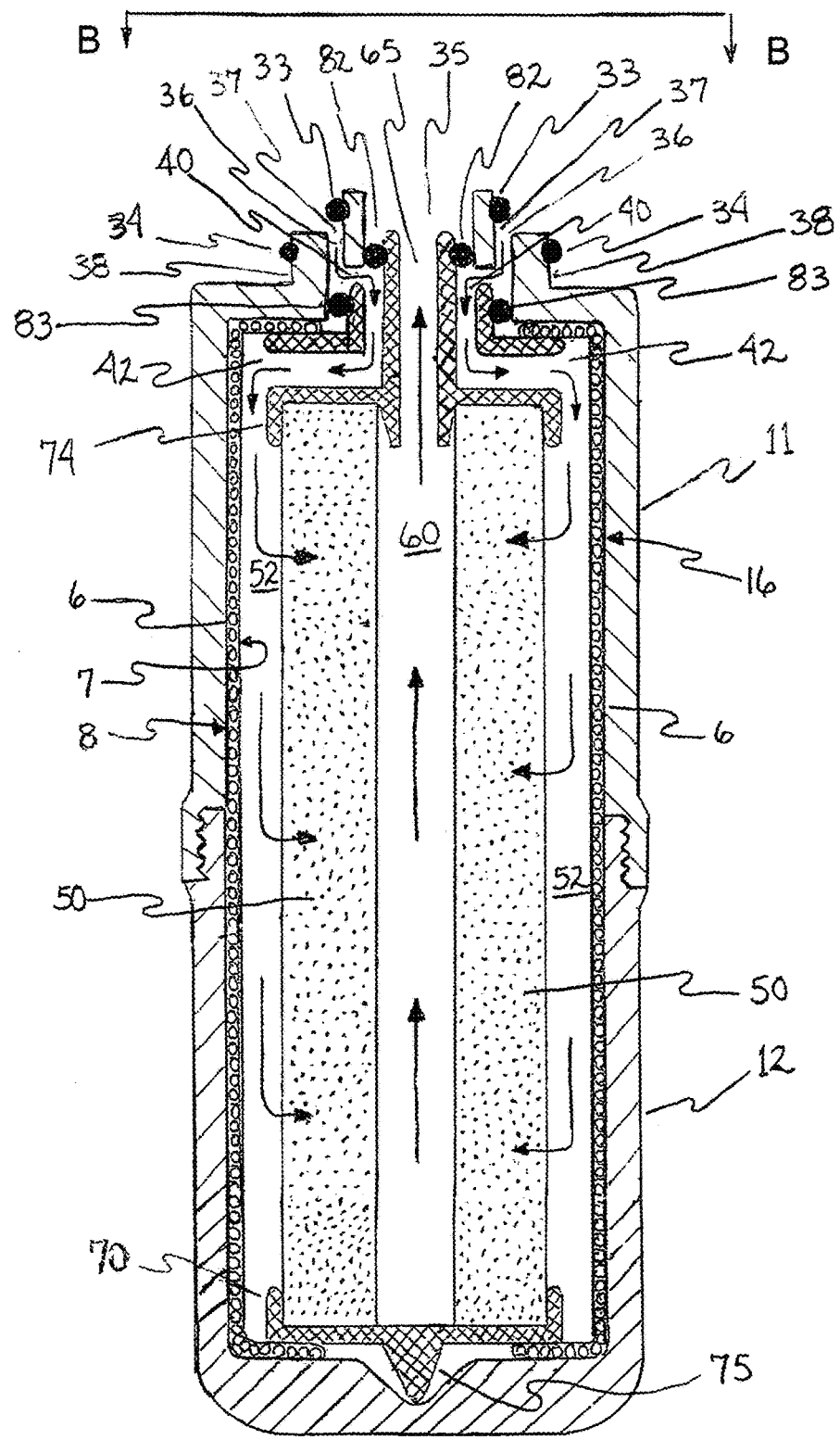
FIG. 2B illustrates a cross-sectional view along line B-B of the embodiment sin in FIG. 2A.

As seen in FIG. 2A-2B, a preferred embodiment of the present invention is shown. Similar to the prior art, system 1 includes upper body 11 with various apertures, including central interior aperture 35 and surrounding exterior aperture 36, and lower body 12. Interior aperture 35 is situated adjacent interior concentric wall 37, while exterior aperture 36 is situated between interior concentric wall 37 and exterior concentric wall 38. Interior gasket 33 is provided along with exterior gasket 34 over rising walls 37 and 38, respectively. Additionally, isolation bag or bladder 6 may be provided within casing 2. Bladder 6 is situated around the treatment medium 50 and endcaps 74 and 70. Interior endcap ring 82 and exterior endcap ring 83, along with interior endcap boss 43 and surrounding endcap boss 44 provide for contact with upper body 11 of casing 2. Endcap ring 83 prevents fluid from flowing outside bladder 6, and directs fluid into flow bypass endcap 74 and subsequently into bladder 6 around treatment medium 50. Improved flow bypass endcap 74 allows for fluid to flow into exterior endcap entryway 40 and through radially emanating endcap side channels 42. Fluid going through endcap side channels 42 enters into bladder system to make contact with the bladder 6 via bladder interior surface 7, as well as treatment medium 50. Bladder exterior surface 8 may contact casing 2 and casing interior surface 16. It is contemplated that bladder will be size to fit, or slightly larger than space within casing to allow bladder to fully fill casing to provide maximum volume for fluid flow, and to also allow casing to provide pressure to support bladder against fluid pressure (along interior). Fluid passes through treatment medium 50 into hollow center 60 and proceeds to exit upwards through central channel 62 to exit endcap exit channel 65 and leave system through casing interior aperture 35.

FIG. 2B provides for a more concrete visual of a flowpath. Fluid enters along improved bypass endcap 74 through exterior channel 36, through exterior endcap entryway 40, and proceeds out through side channel 42 into interior space 52 surrounding treatment medium 50. Fluid passes through treatment medium 50 into hollow center 60 and out through central exit 65 exiting system through interior concentric aperture 35. With bladder 6 between interior space 52 and casing interior surface 16 casting interior surface 16 is thus shielded from contact with passing fluid.

Figure 3A:
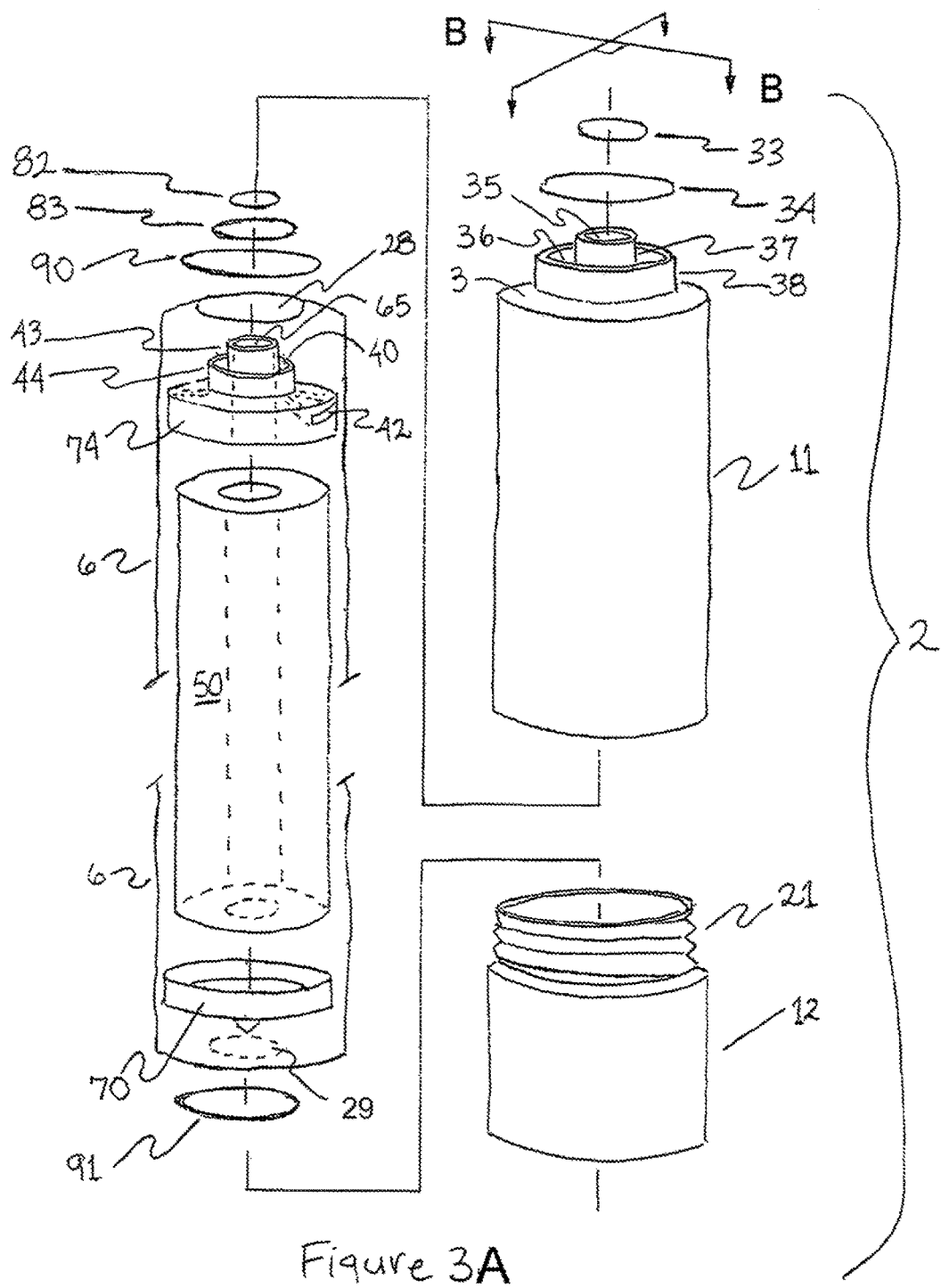
FIG. 3A illustrates an exploded view of an embodiment of the present invention.
Figure 3B:
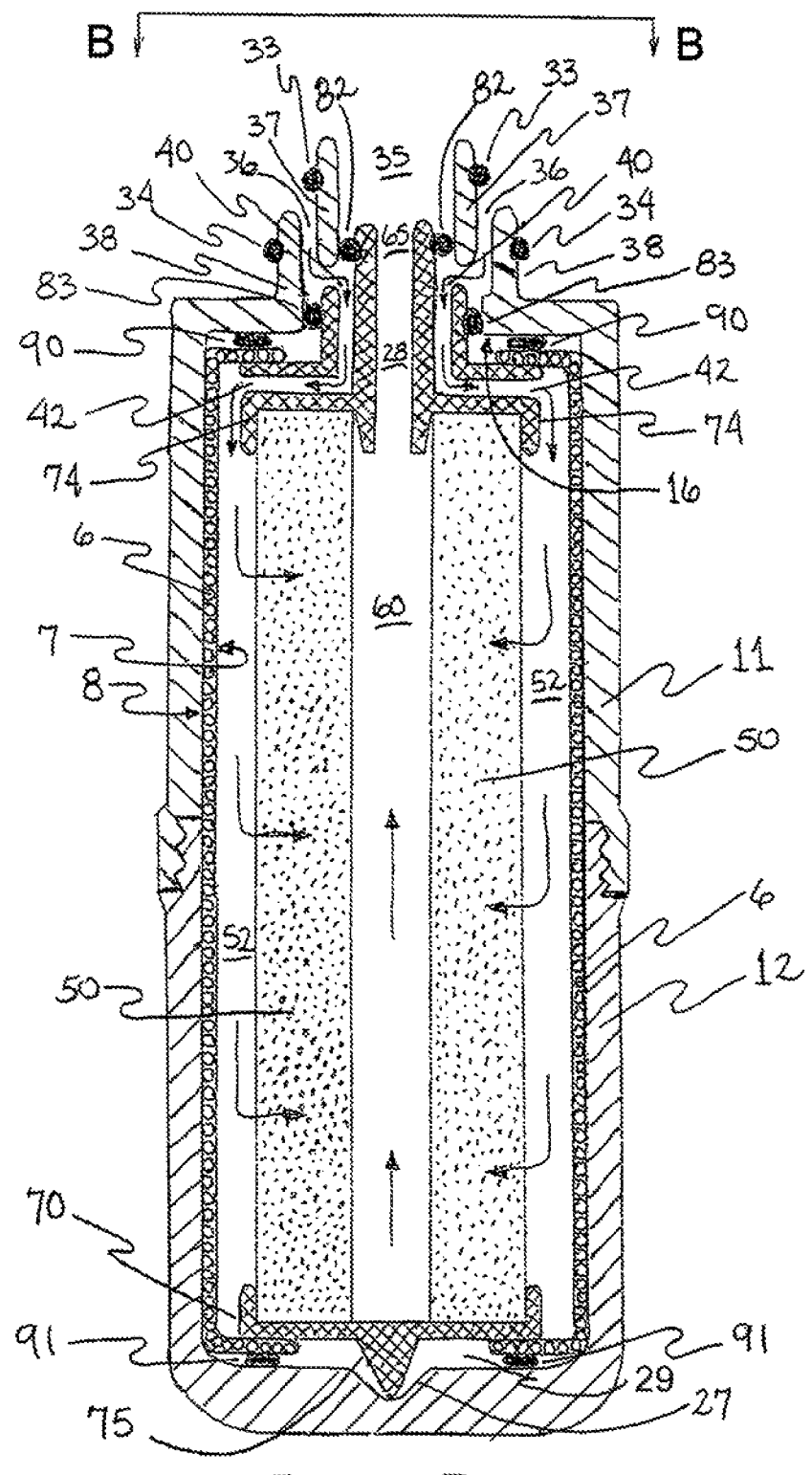
FIG. 3B illustrates a cross-sectional view along line B-B of the embodiment shown FIG. 3A.
Figure 3C:
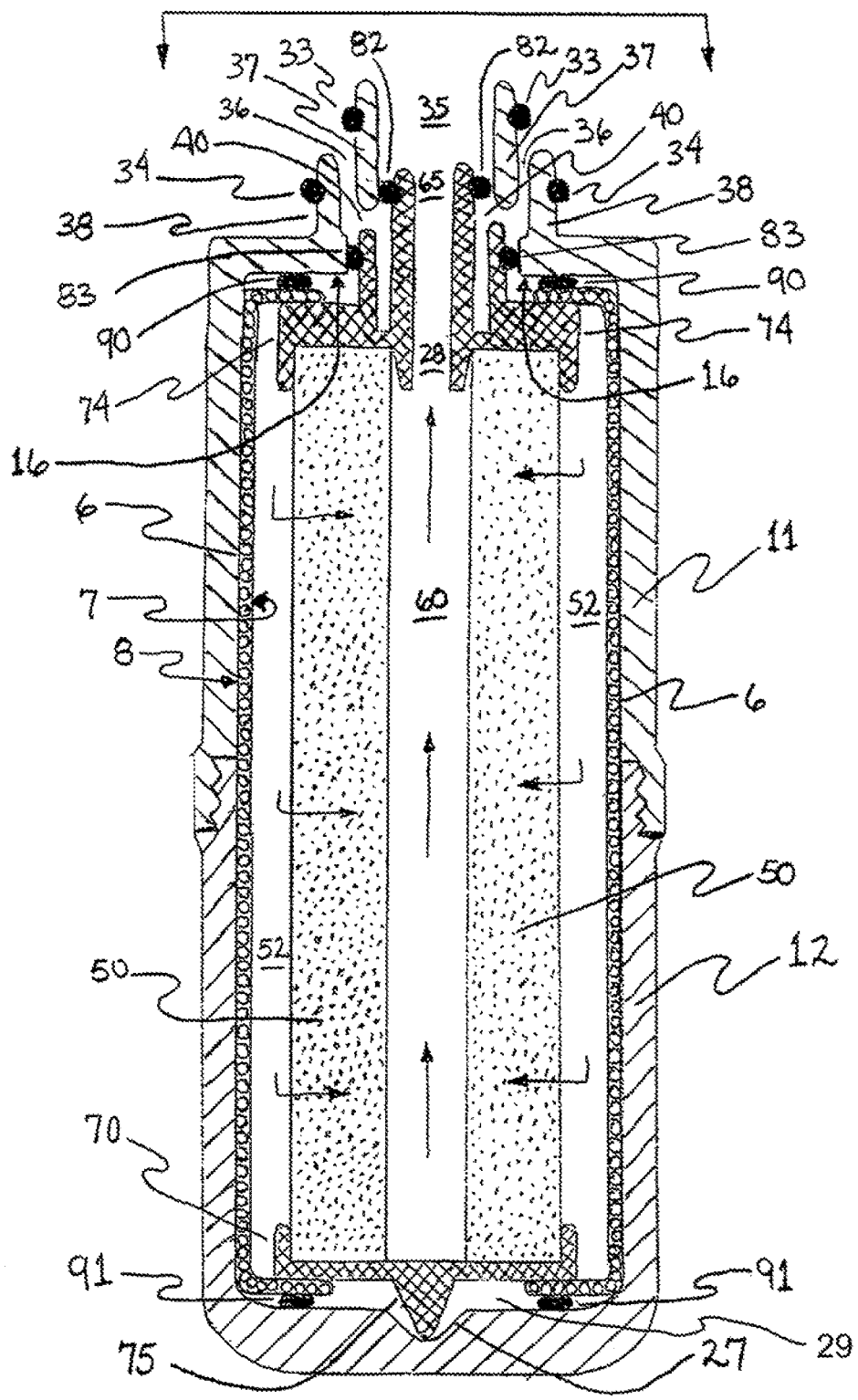
FIG. 3C illustrates a cross-sectional view along line C-C of the embodiment shown in FIG. 3A.
Figure 3D:
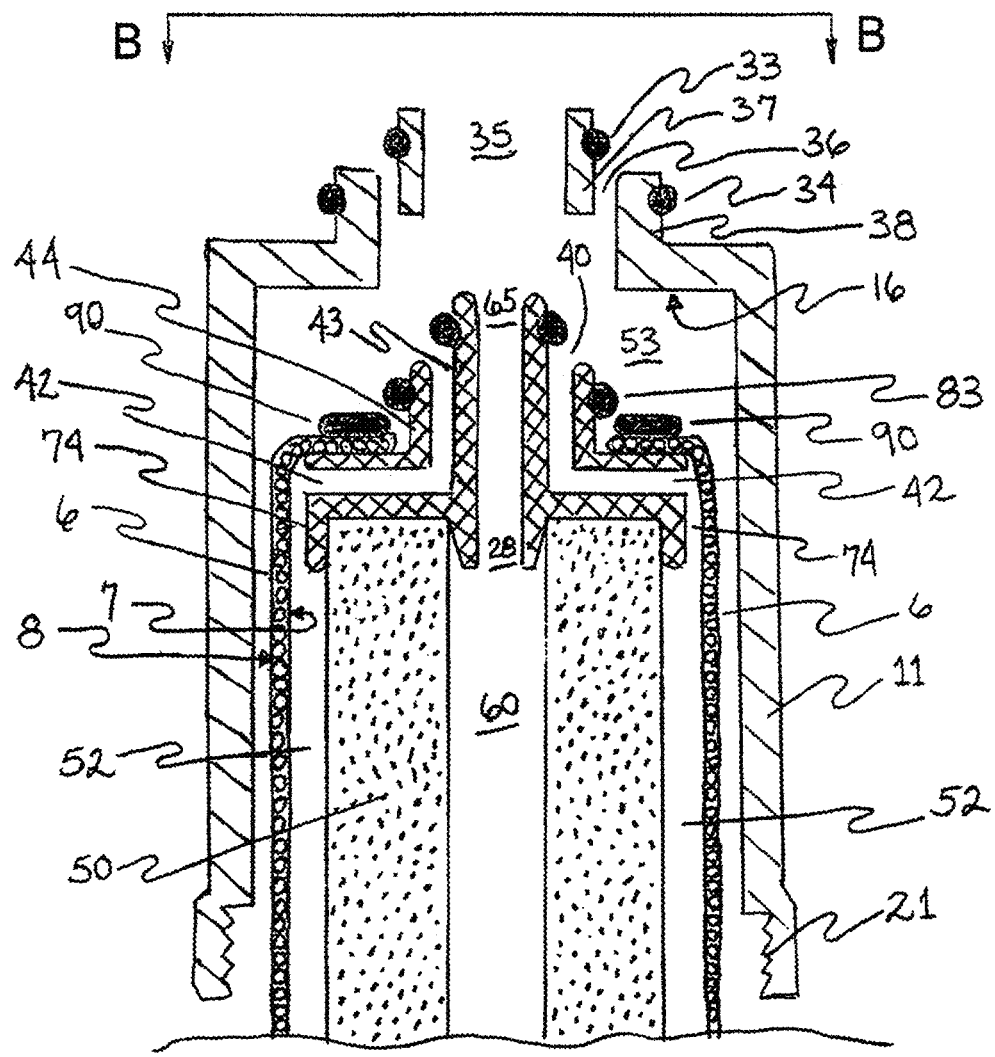
FIG. 3D illustrates a partially exploded cross-sectional view of the treatment media cartridge apart with easing along line B-B of the embodiment shown in FIG. 3A.

As can be seen in FIG. 3A-3B, another alternative embodiment includes additional gaskets may be used to hold treatment medium within endcap 74 and lower endcap 70 in easing 2. Endcap seal rings 90 and 91 (top and bottom) may be affixed on either end of the filtration modular unit to seal bladder 6 along casing surface 16. Top endcap seal ring 90 serves to hold down upper body 11 as a cap to prevent separation of upper body from treatment cartridge. Otherwise, a weld, bond, pine, or other fastening system known in the art will be used to affix endcap to bladder to upper body 11. In addition, to endcap seal ring 90 prevents pinching bladder when casing is screwed together. In this embodiment, bladder includes two apertures, an upper apertures 28 (as found in other shown embodiments) and lower aperture 29 to allow for flow path to enter bladder 6. Here, bladder 6 also includes lower aperture 29 to provide surface pin 75 to contact lower body 12, preferably along recess 27.

Figure 4A:
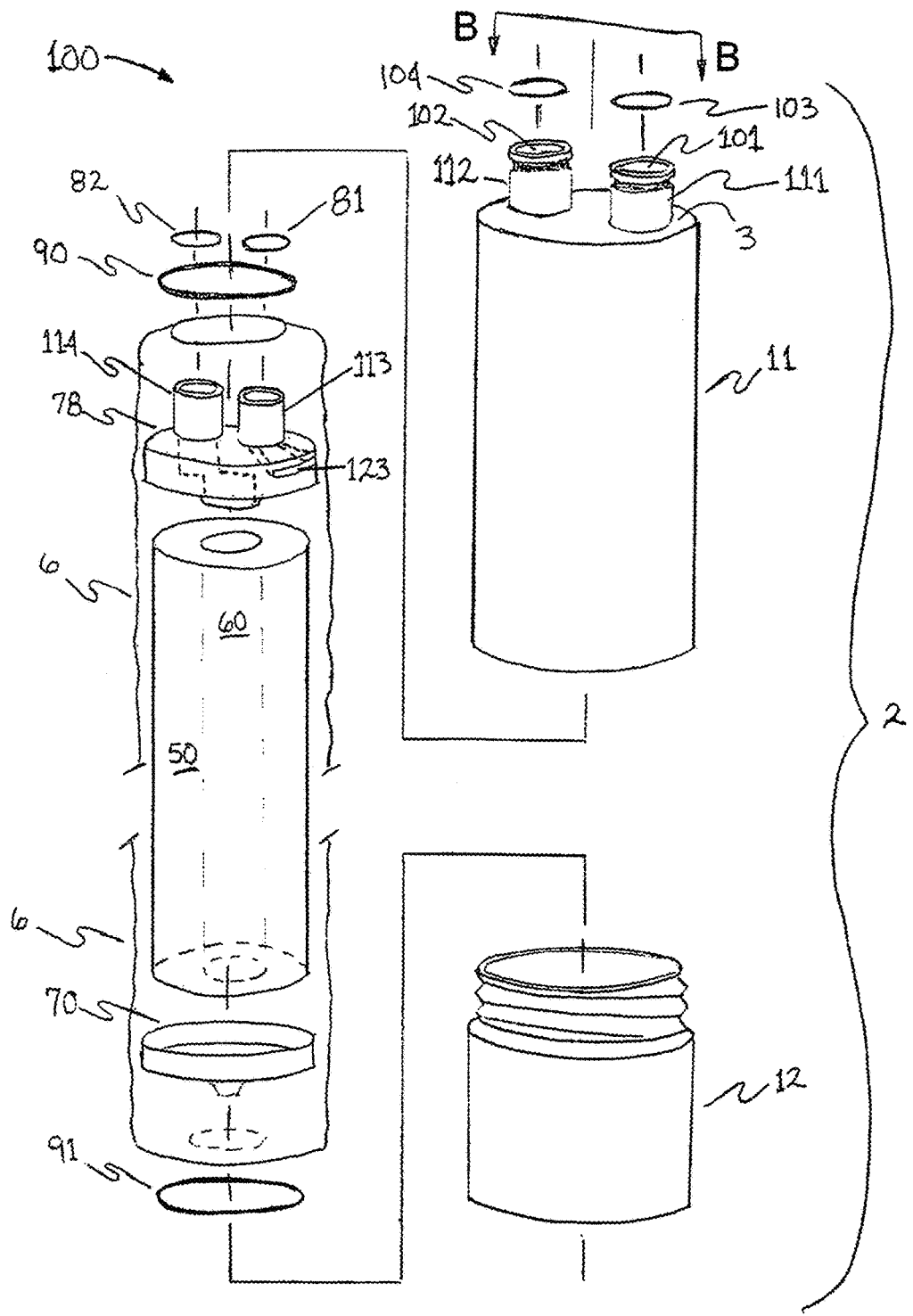
FIG. 4A illustrates an exploded view of an embodiment of the present invention.
Figure 4B:
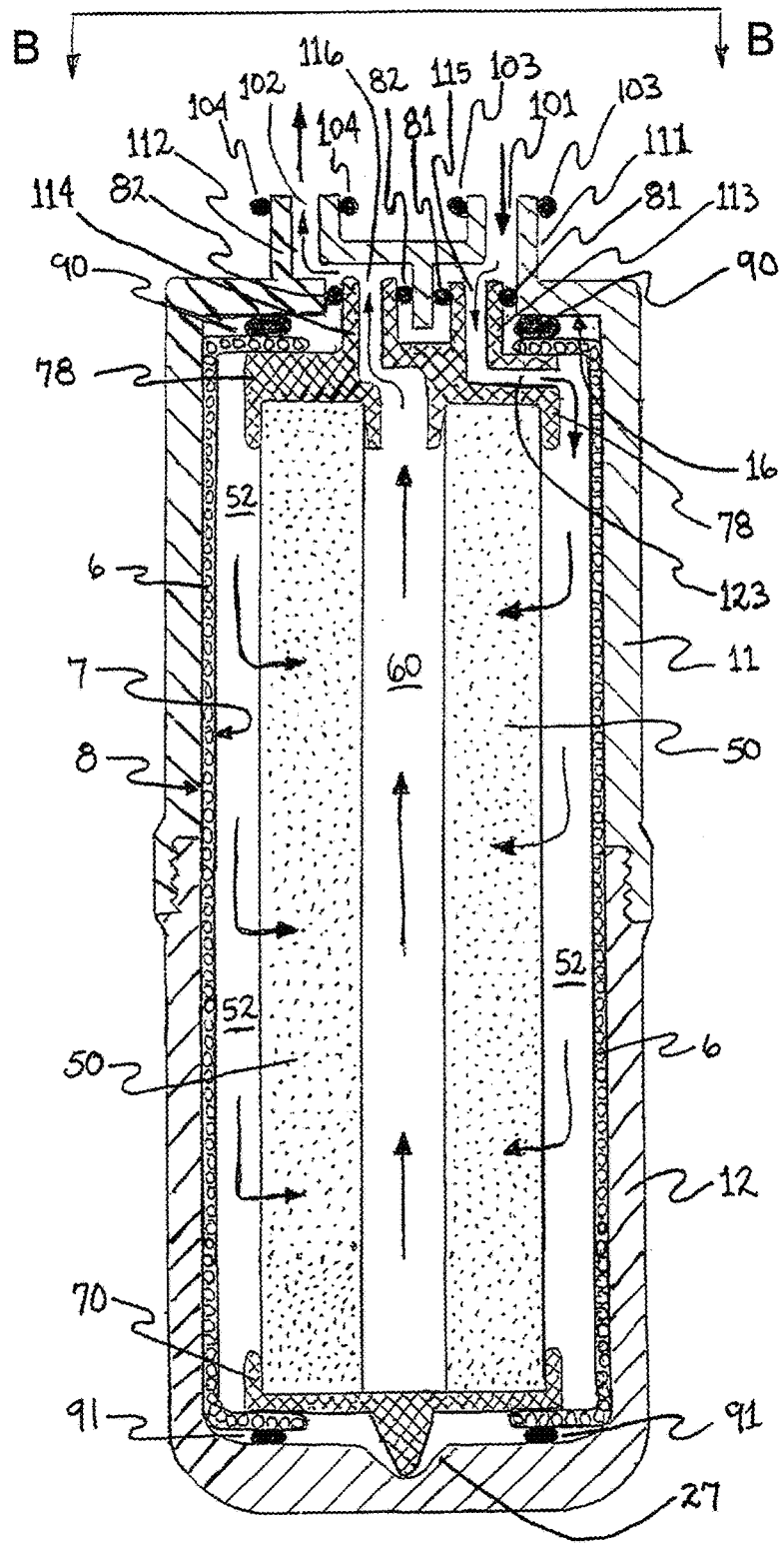
FIG. 4B illustrates a cross-sectional view along line B-B of the embodiment shown in FIG. 4A.
Figure 9A:
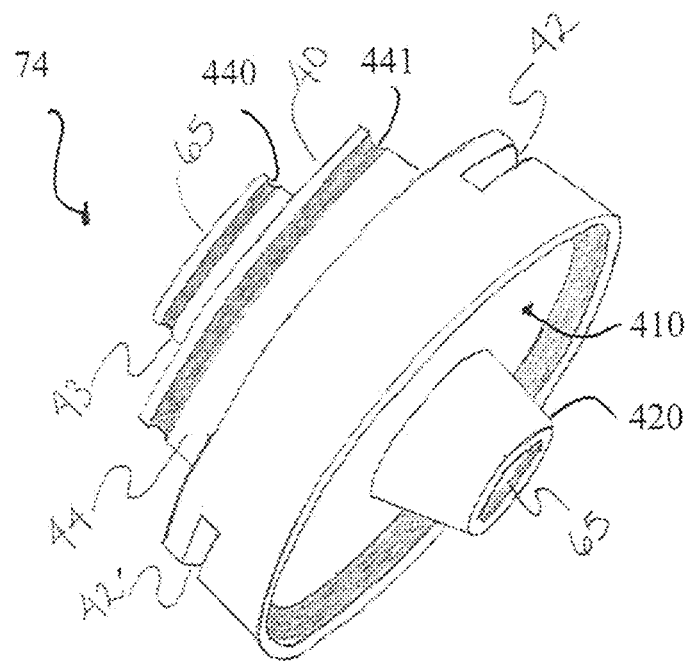
FIG. 9A shows a perspective view of an embodiment of a dual flow bypass endcap of the present invention.
Figure 9B:
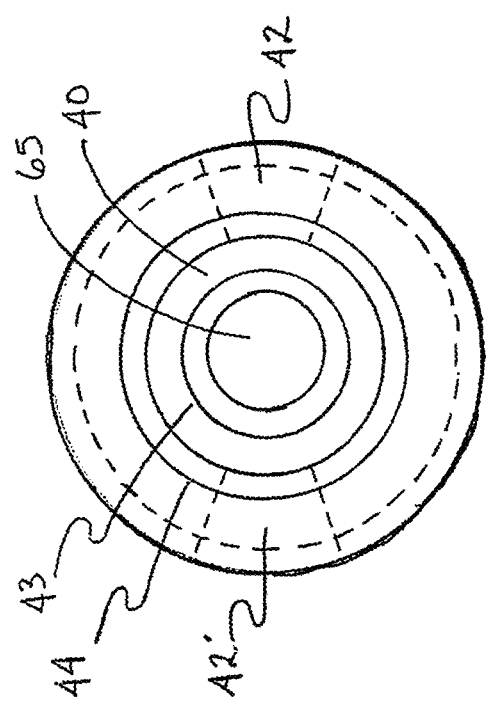
FIG. 9B shows a top view of a dual flow bypass endcap of an embodiment of the present invention.
Figure 9C:
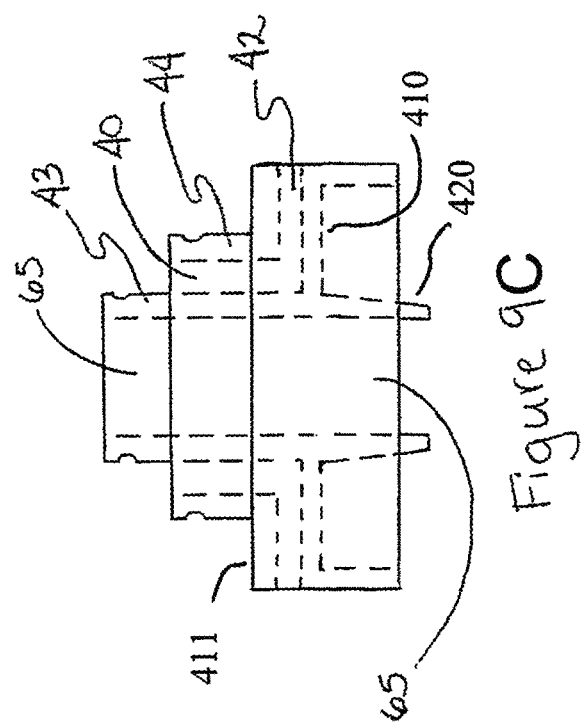
FIG. 9C shows a side view of a dual flow bypass endcap of an embodiment of the present invention.
Figure 9D:
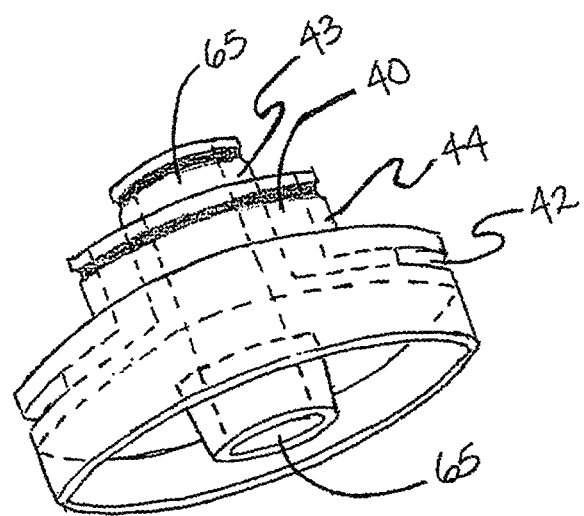
FIG. 9D shows an alternative perspective view of the dual flow bypass endcap of an embodiment of the present invention.

FIGS. 4A and 4B show an alternative embodiment of the present invention. In such embodiment, separate left and right apertures 101 and 102 are provided along upper body 11 in casing 2 to allow entry and exit of fluid into the system. Given that most filtration systems are cylindrical and may be installed in either direction based on the complementary fluid source, left and rights directions are merely provided for illustrative purposes. Fluid enters system 100 into easing 2 through right aperture 101 with a boss 111 and related gasket 103 (gasket 103 is adapted to mate with a fluid source system, such as a refrigerator water system, etc.). Fluid then passes through boss 111 past gasket 81, and through interior of endcap seal ring 90 and into bypass endcap 78 through boss 113 and out through side channel 123 to be directed into interior space 52. Fluid then passes through treatment medium 50 into hollow center 60 and exits through path endcap exit riser 114 out endcap aperture 116 through endcap seal ring 90 and interior endcap)-ring (gasket) 82 to provide the flowpath. Fluid exits casing through riser 112 past O-ring 104 and exit aperture 102. Further detail on an endcap for this embodiment is shown below in FIGS. 9e-9f.

Figure 5A:
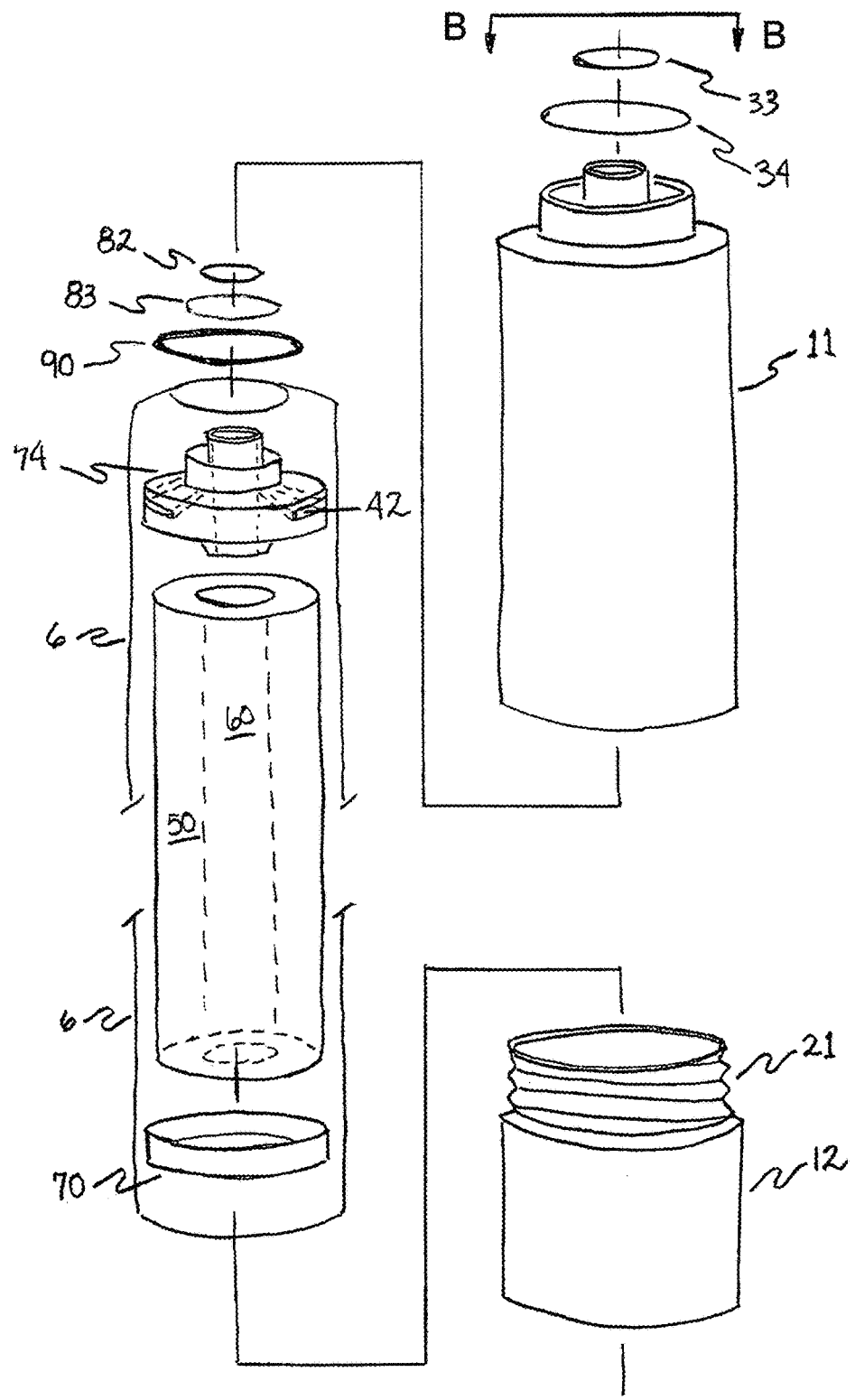
FIG. 5A illustrates an exploded view of an embodiment of the present invention.
Figure 5B:
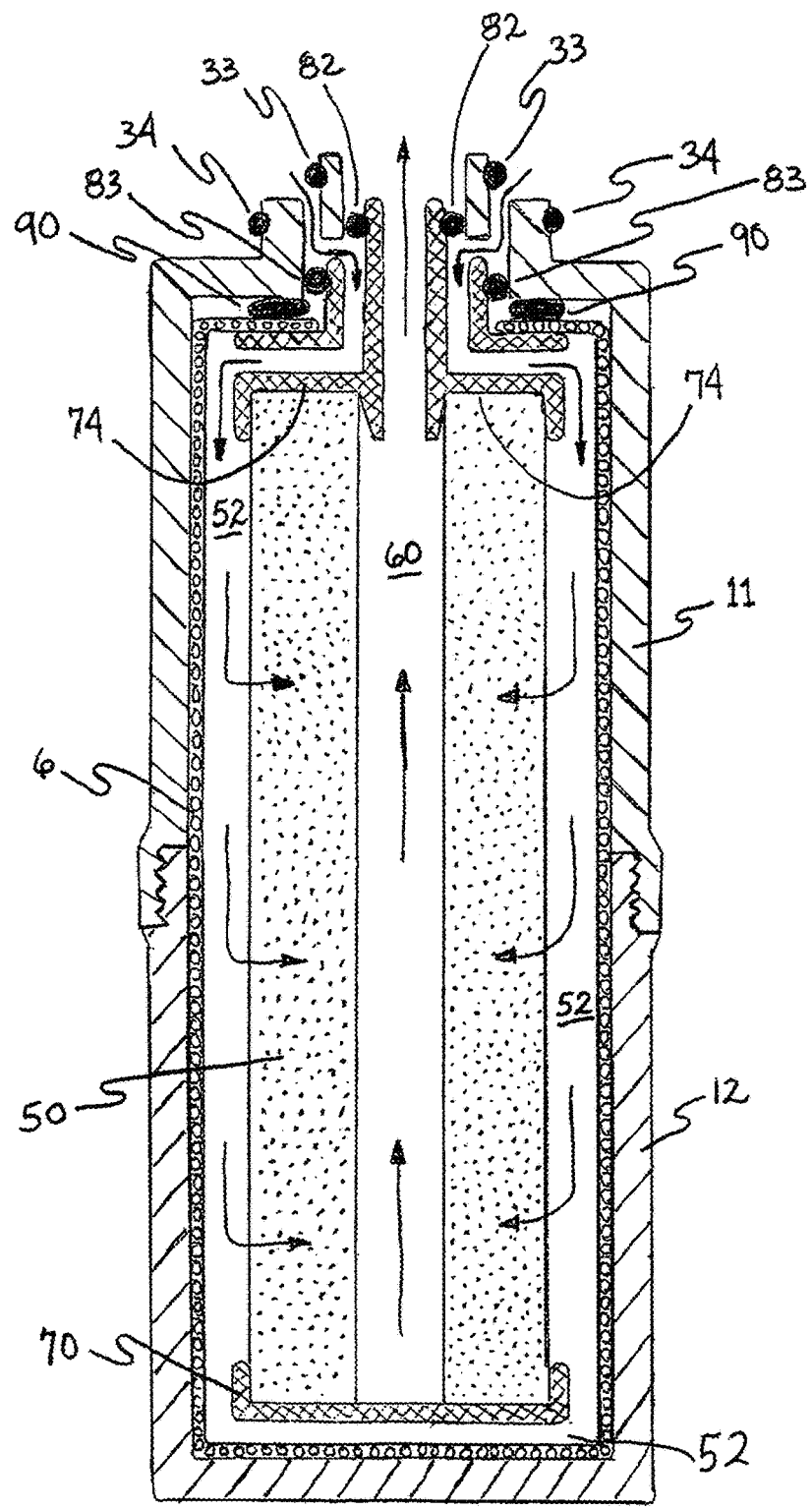
FIG. 5B illustrates a cross-sectional view along line B-B of the embodiment shown in FIG. 5A.
Figure 6A:
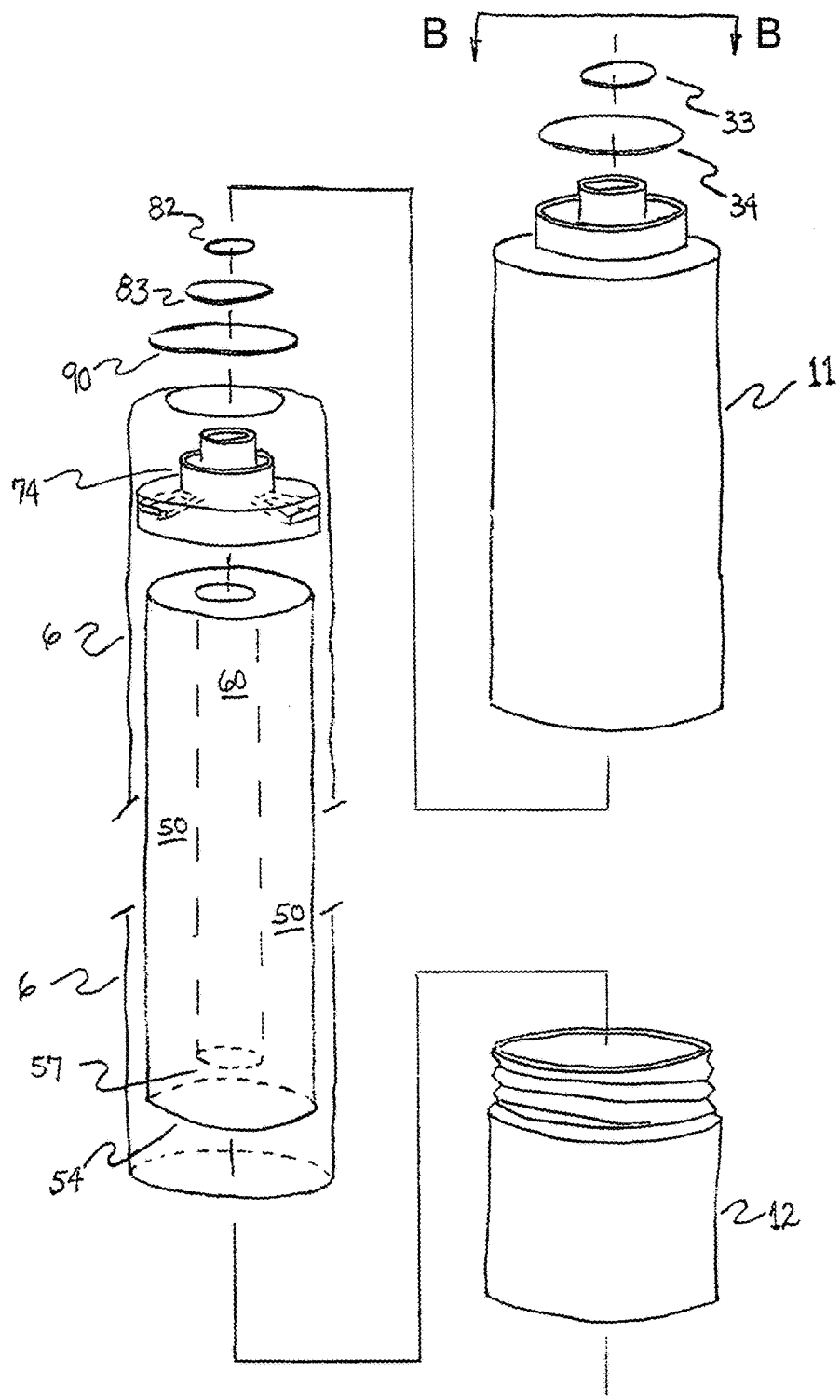
FIG. 6A illustrates an exploded view of an embodiment of the present invention.
Figure 6B:
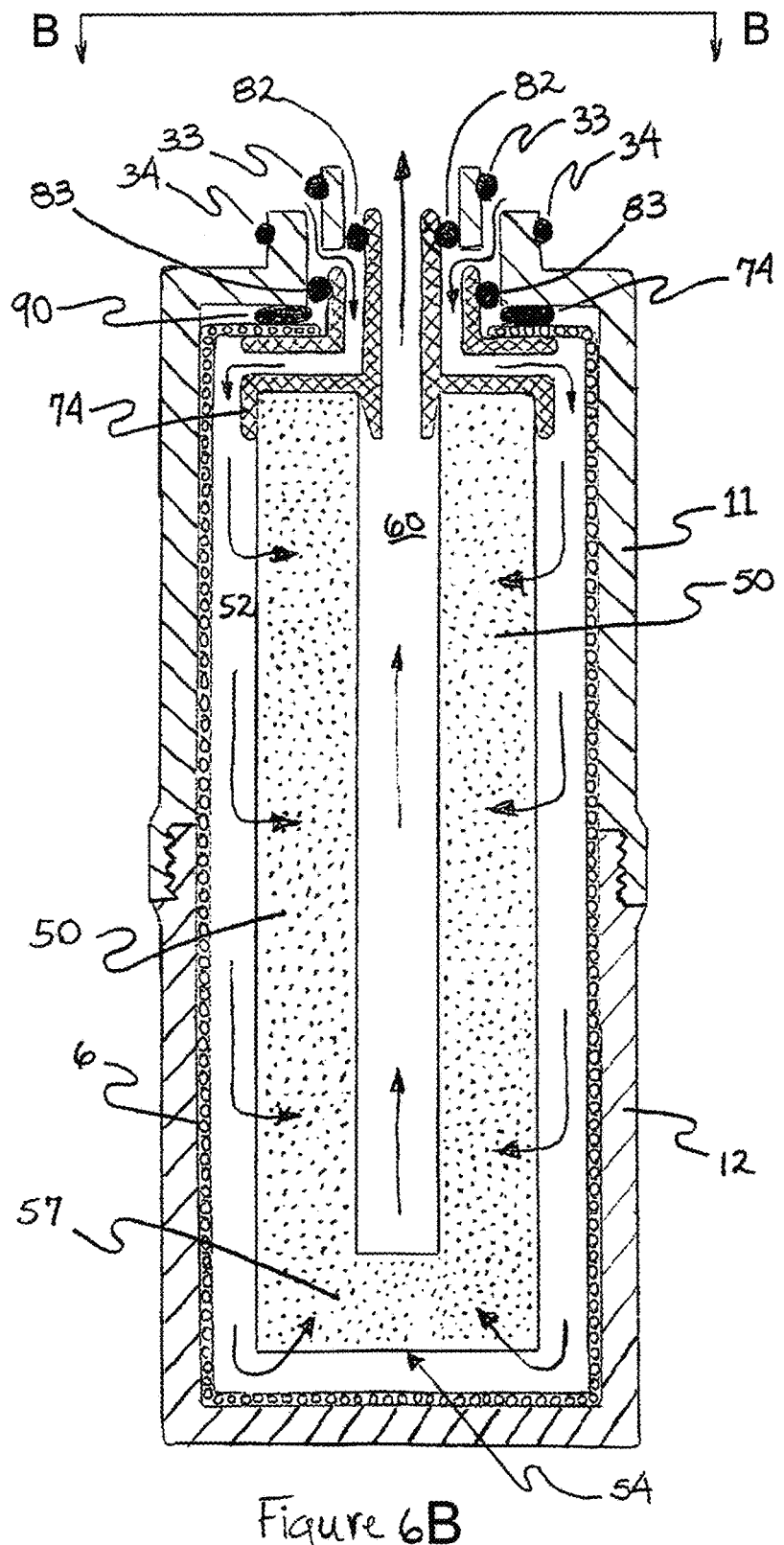
FIG. 6B illustrates a cross-sectional view along line B-B of the embodiment shown in FIG. 6A.

As can be seen in FIGS. 5A and 5B, an alternative embodiment includes bottom endcap 70 which may not be mounted onto casing lower body 12, but provide an additional volume of interior space 52 outside of treatment medium 50 within bladder 6. Alternatively, as can be seen in FIGS. 6A and 6B, treatment medium 50 can include a cup shape bottom 57, including solid treatment medium bottom surface 54 of filtration material 50 so that fluid may enter both around the circumference and length of treatment medium 50 as well as through bottom surface 54. The cup shape bottom eliminates the need for bottom endcap 70 and benefits by providing additional surface area in treatment medium to interface with fluid in interior space 52.

Figure 7A:
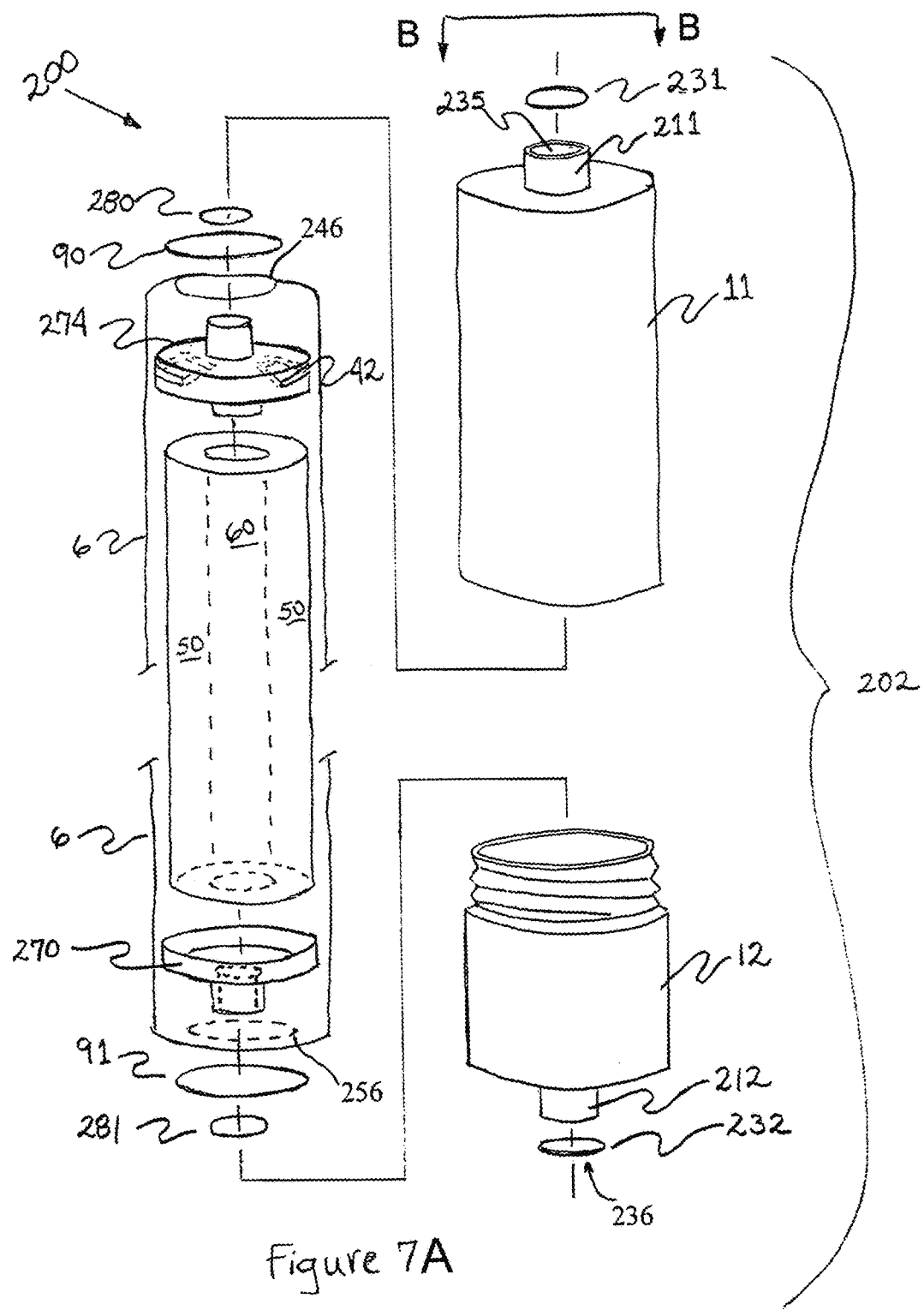
FIG. 7A illustrates an exploded view of an embodiment of the present invention.
Figure 7B:
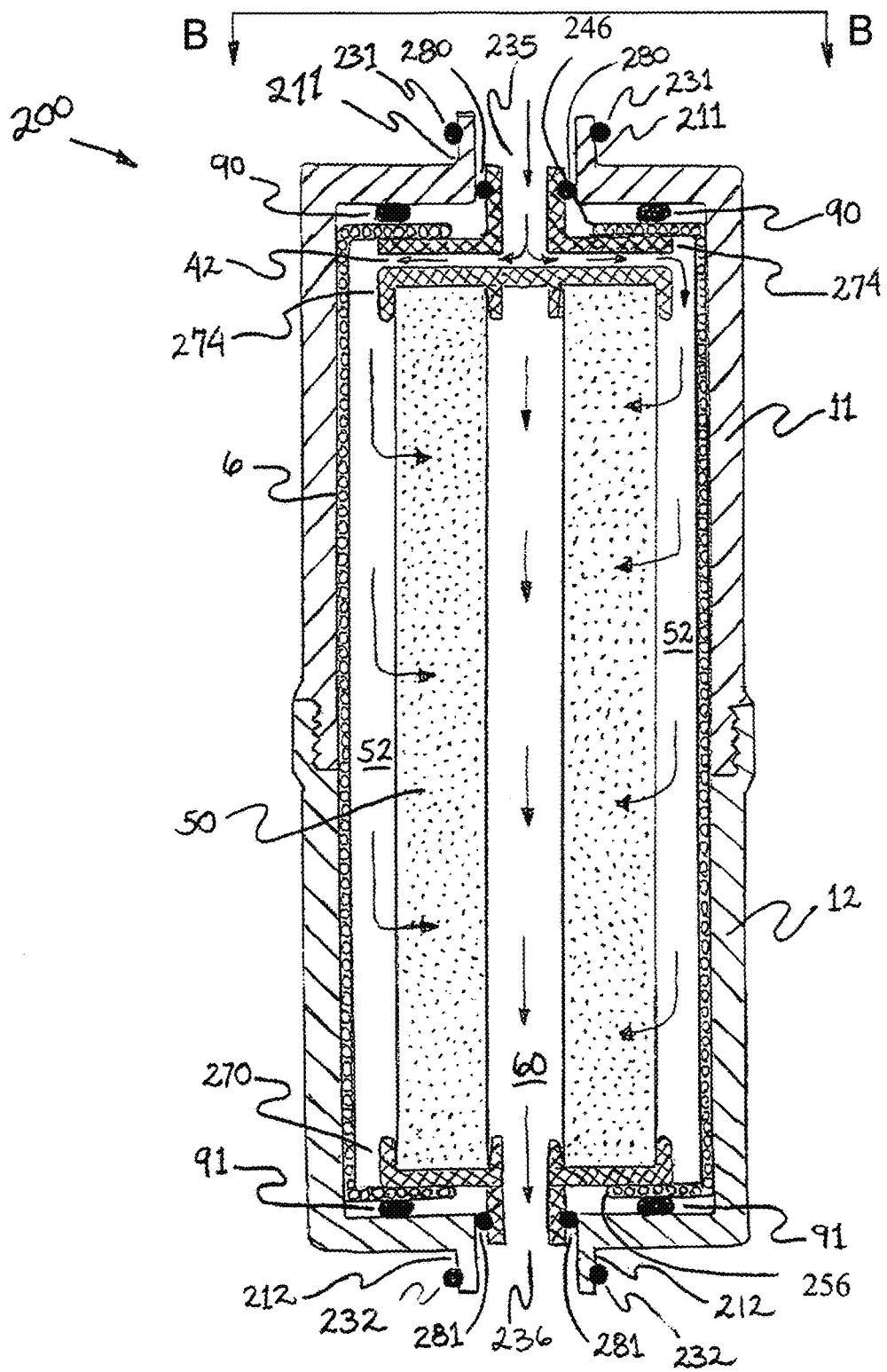
FIG. 7B illustrates a cross-sectional view along line B-B of the embodiment shown in FIG. 7A.

While earlier embodiments include an open loop flow path whereby fluid enters and exits the top, as can be seen in FIGS. 7A and 7B, an alternative path flow is provided for a more linear flow path. Fluid enters top and exits bottom of figure as shown. In such system 200, fluid enters through the aperture 235 through riser 211 into endcap 274, passes out of endcap side channels 42 into interior space 52 before passing through treatment medium 50 into hollow center 60, and out of bottom aperture 236 through riser 212 in open lower endcap 270. In this embodiment, bladder 6 includes upper aperture 246, through which fluid may enter the system through endcap 274, and a lower bladder aperture 256, through which fluid may exit via bottom aperture 236. Upper and lower O-rings 231 and 232 are provided along each end, upper O-ring, 231 along the top near entry of fluid into system. Lower O-ring 202 is found at bottom near exit of flow from system. It is contemplated that both upper and lower O-rings 231 and 232 with upper and lower risers 211 and 212 to mate with a fluid flow path source and delivery system (not shown). Upper and lower endcap O-rings 280 and 281 serve to, affix and seal upper and lower endcaps 274 and 270 to casing 202. Endcap seal rings 90 and 91 serve to affix bladder 6 (around bladder apertures 246 and 256, to casing 202 and further isolate casing 202 from fluid flow. Endcap seal rings 90 and 91 serve to secure the bladder to endcap. Optionally, the bladder may be adhered or affixed directly to endcap.

Figure 8A:
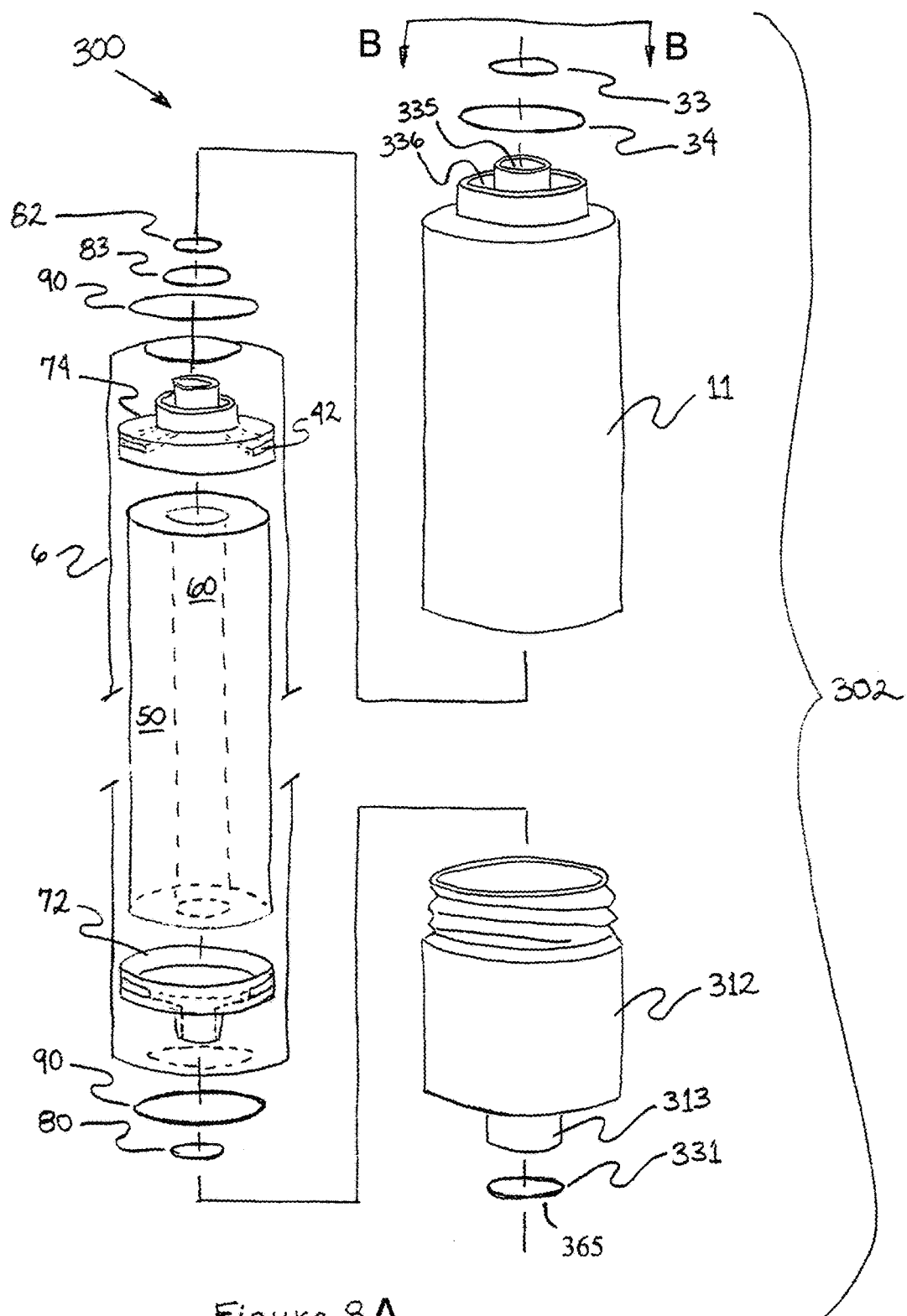
FIG. 8A illustrates an exploded view of an embodiment of the present invention.
Figure 8B:
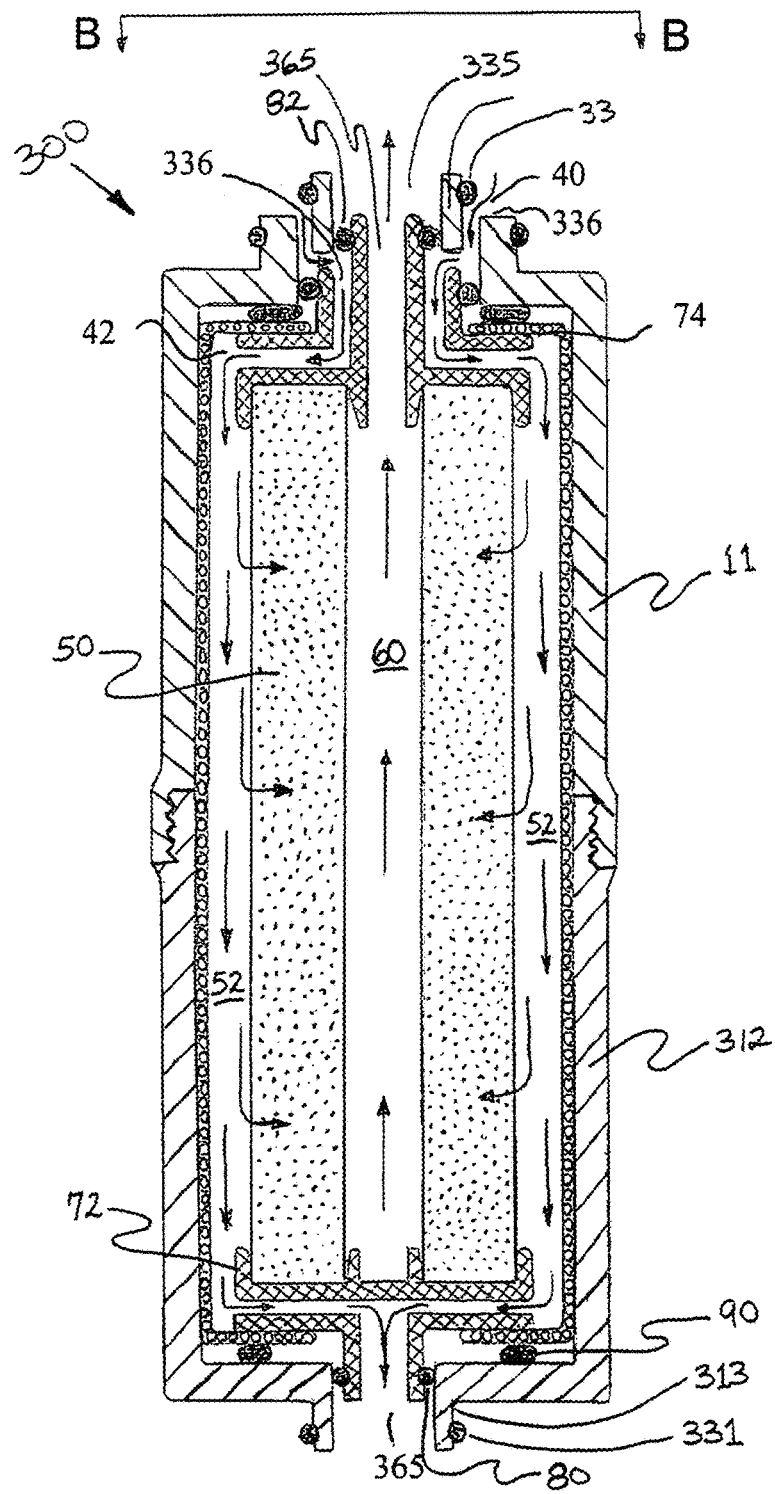
FIG. 8B illustrates a cross-sectional view along line B-B of the embodiment shown in FIG. 8A.

In another embodiment as shown as FIGS. 8A and 8B, such as for a reverse osmosis system, three separate water paths are provided. Casing 302 includes an upper body 11, similar to other embodiments such as shown in FIGS. 2 and 4, however this embodiment includes a different open lower body 312 providing for exit pathway 365. Open lower body 312 includes lower riser 313 surrounding exit pathway 365, with an optional mating ring 331 to provide for complimentary fit with a waste receptacle or drain (not shown). Fluid enters through exterior concentric aperture 336 through flow path of exterior entryway 40, through endcap 74 endcap side channels 42 to flow into interior space 52 outside of treatment medium 50 (in this case, treatment medium is preferably an RO membrane or membrane system as is known in the art). Fluid passes through treatment medium 50 exits into hollow center 60 and out of top exit port 335. Remaining untreated fluid (effluent, discharge, etc.), which did not pass through treatment medium, exits below through lower endcap aperture 365 through body exit 366. Lower endcap 72 is provided to allow for untreated fluid to pass by treatment medium 50 and exit past lower riser 338 through bottom port 366.

As can be seen in a closeup of an endcap of the present invention in FIGS. 9A-9D (similar to the endcap found in FIG. 2, 3, etc.) Endcap 74 includes interior endcap boss 43, and surrounding endcap boss 44 with exterior endcap entryway circumscribing interior endcap boss 43 within surrounding endcap boss 44. Fluid enters entryway 40 and exits through endcap side channels 42 and 42'. Bosses featured on the top of end cap may include recesses, such as interior boss recess 440 and surrounding boss recess 441 to receive O-rings 82 and 83, respectively. Recesses are optional. Interior endcap boss includes a hollow to allow for exit channel 65 for fluid to exit the system therethrough. Fluid initially enters through exterior endcap entryway 40 past washer O-ring 83 into endcap side channels 42 and 42' whereby the fluid can then be exposed to a treatment medium within a bladder (not shown). Treated fluid passes through aperture central channel 65 shown with optional nipple 420 and out of exit channel 65 at top center. Endcap 74 may include underside surface 410 adapted to mate adjacent to filtration medium (not shown). Endcap 74 includes top surface 411 adapted to mate with bladder and or seal ring above side channel 41.

Figure 10A:
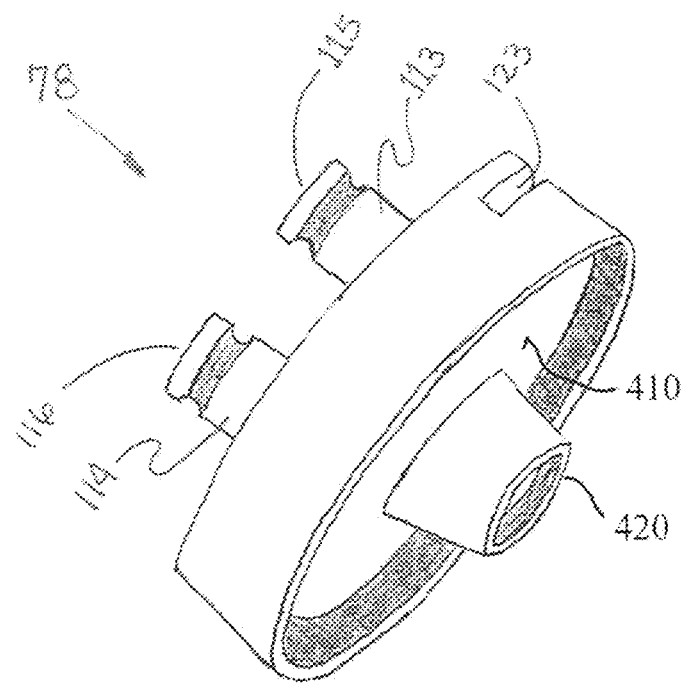
FIG. 10A shows a perspective view a dual port endcap of an embodiment of the present invention.
Figure 10B:
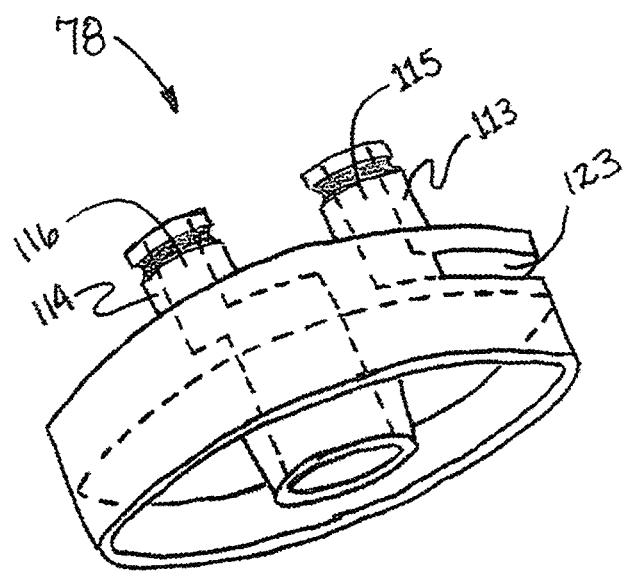
FIG. 10B shows an alternative perspective view of the dual port endcap of an embodiment of the present invention.

FIGS. 10A and 10B demonstrate an alternative endcap as seen, for instance in the embodiment shown in FIG. 4, etc.). As understood in conjunction with the description of FIGS. 4a-4c above, endcap 78 includes an entry way 115 mated with flow path 101 (not shown). Fluid passes into endcap entry boss 113 and out through side channel 123. Once treated, fluid may re-enter endcap 78 through optional nipple 420 to pass through endear exit boss 114 through exit path 116 to flow path 102 (not shown). Recesses 181 and 182 may be provided to support gaskets 81 and 82 (not shown). Similar to other endcap designs surface 410 is adapted to mate with a treatment medium.

Figure 11A:
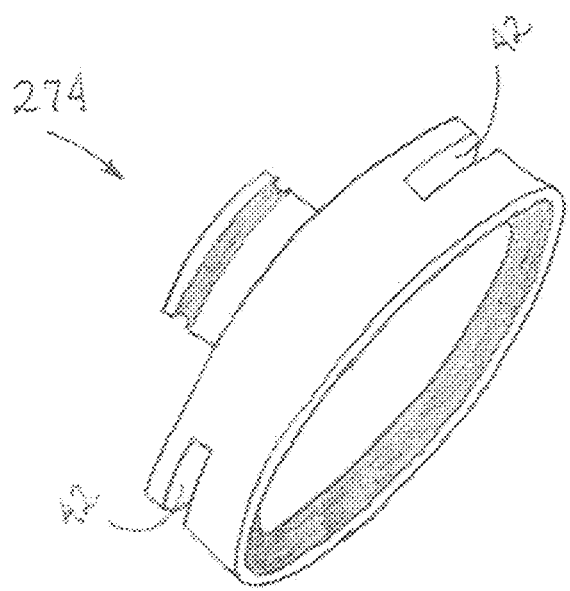
FIG. 11A shows a perspective view of a single bypass endcap of an embodiment of the present invention.

As seen in FIGS. 11A and 11B, an endcap 274 is shown as might be used as a top flow bypass endears 270 of the embodiment shown in FIG. 7, or as the bottom endcap 72 for the flow through embodiment (such as an RO) as shown in FIG. 8.

Figure 12:
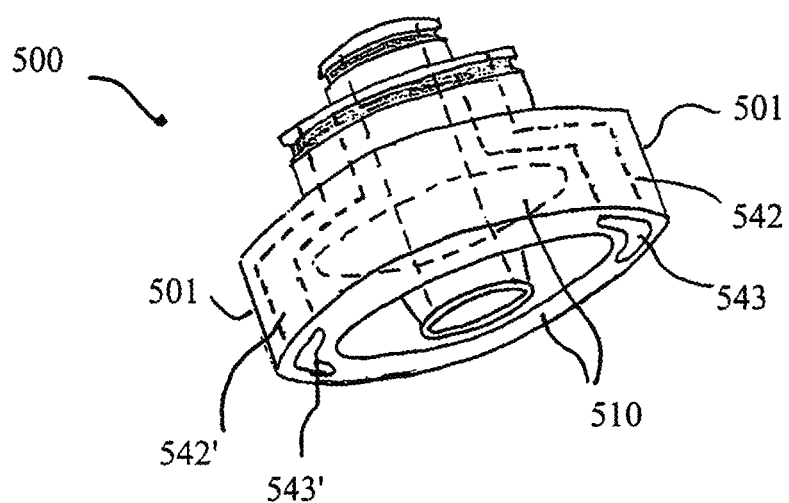
FIG. 12 demonstrates perspective view of an alternative embodiment of an endcap of the present invention.

As seen in FIG. 12, an alternative embodiment of the flow path end cap is shown. The bladder may be affixed, or coupled with endcap directly, via, seal rings, or otherwise as may be understood in the art. The bladder may be sandwiched between the endcap and casing upper body. In alternative embodiments, as shown in FIG. 12, endcap 500 allows a bladder to interface with a side 501 of the endcap 500. Side channels 542 and 542' include outlets 543 and 543' to allow for fluid to exit outlets 543 and 543' into interior space around a treatment medium from bottom surface 510 of endcap 500. Similarly, bladder may adhere or affix to the side of the endcap, and may be held by a seal ring, and may be held via elastics seal ring, or otherwise pressed into a surface of casing upper body. In other embodiments contemplated, bladder may be affixed to the bottom surface of the endcap, so long as the outlets are providing within the bladder.

Figure 13:
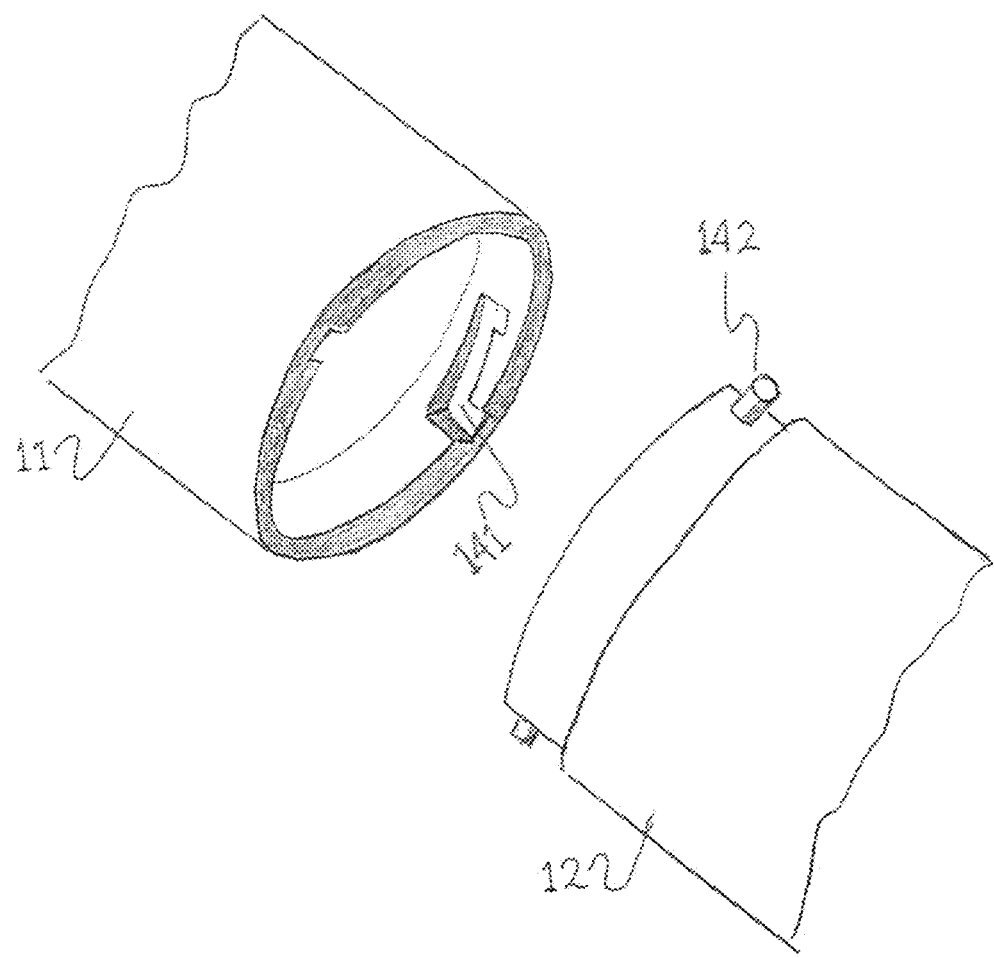
FIG. 13 shows a partial exploded perspective view of an opened casing of an embodiment of the present invention.
Figure 14A:
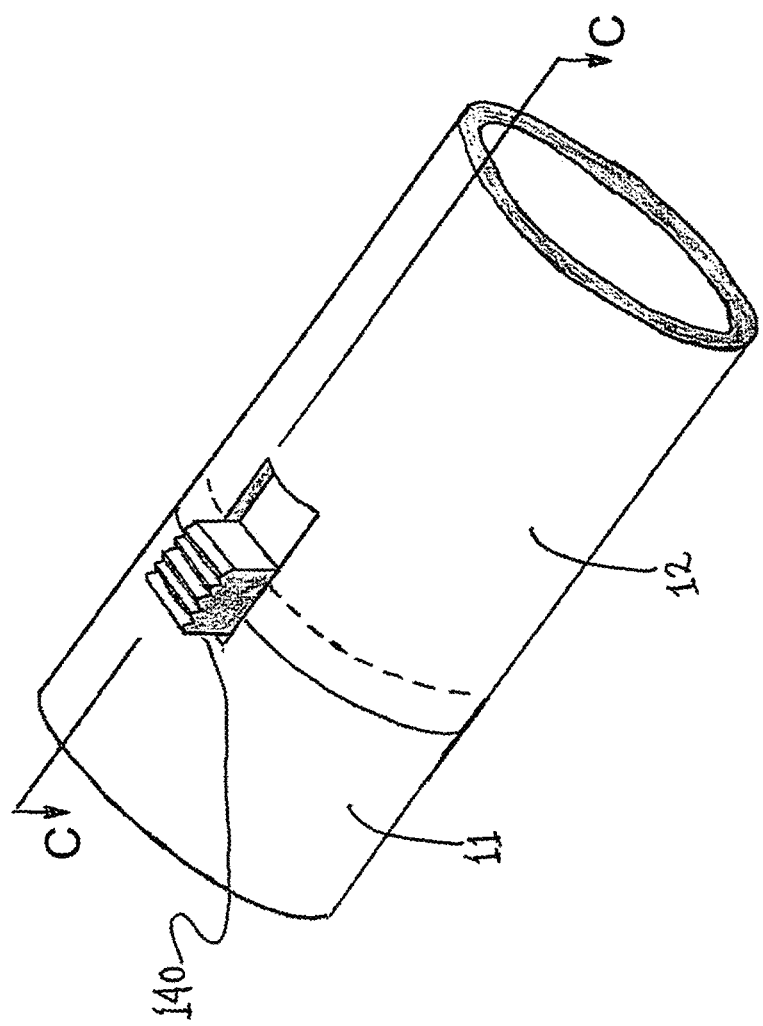
FIG. 14A shows a partial perspective view of a fastened casing and locking mechanism of an embodiment of the present invention.
Figure 14C:
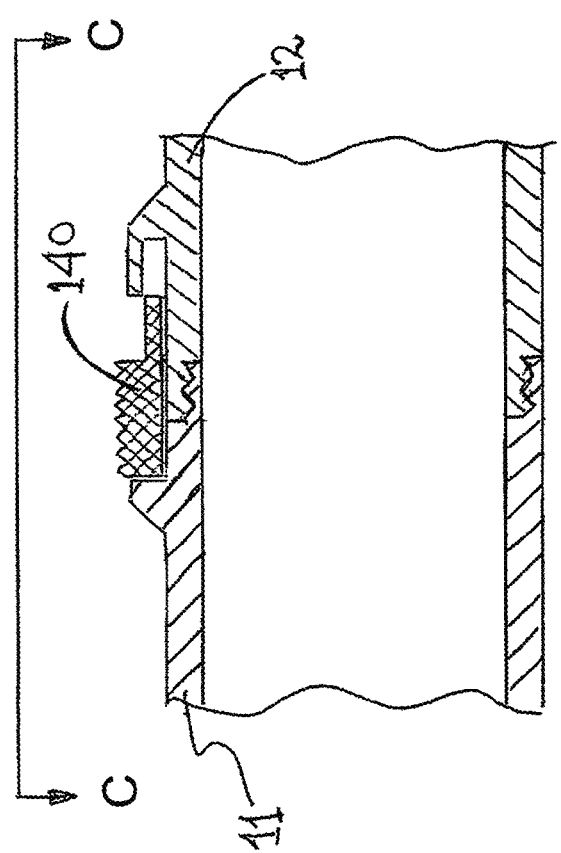
FIG. 14C illustrates a partial cross-sectional view along line C-C of FIG. 14A.

Alternative ways of mating upper body 11 with lower body 20 are contemplated and shown in FIGS. 13, 14A-14C. Upper and lower bodies 11 and 12 may be mated with threading or any known fastener known in the art. For instance, a simple slide lock can be applied, whereby at least one post 142 is provided in groove 141 as seen in FIG. 13. A switch-lock may be provided via switch 15 in FIGS. 14A-14C whereby upper and lower body 11 and 12 may be mated and held in place with a tab or switch-lock 140.

Figure 15:
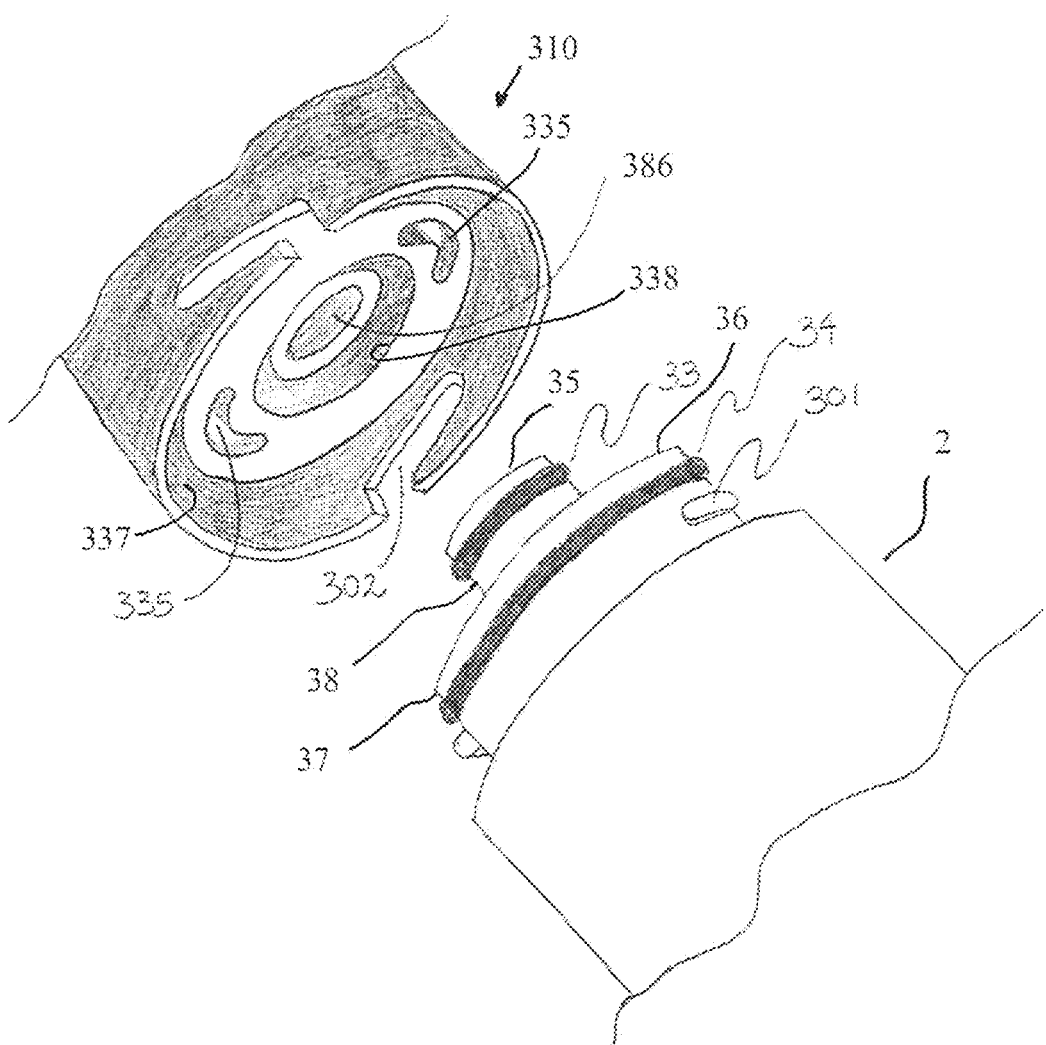
FIG. 15 shows a partial perspective view of a filter assembly interface of an embodiment of the present invention.

As can be seen in FIG. 15, filtration system is adapted to mate with a fluid source, as is known in the art. Casing 2 may include a large male thread 301 to mate with female thread guide 302 in fluid source 310 to lock system in place. Mating O-rings/gaskets 33 and 34 allow for riser 37 and 38 to mate with fluid source surface 337 and 338 respectively. Fluid is supplied form source via outlets 315 through casing exterior aperture 36 and exits through casing interior aperture 35 to return to fluid source (and potential dispenser of treated fluids) via treated fluid pathway 386. One major benefit of the present invention is that the filtration systems are intended for use with current prior art water source systems. The water filtration systems are commonly used in refrigerators to provide potable water, and other systems as are known in the art. These systems often include a disposable filtration system whereby the entire unit end casing will be removed and disposed of to be replaced. Alternative systems include a replaceable filtration cartridge that is enclosed within a casing. These casings open to provide access to the treatment medium which can then be disposed of and replaced. The novel aspect of the present invention is the use of a bladder system which provides for a more sanitary replacement of filtration unit. By removing the entire bladder including the treatment medium embedded therein, the casing interior surface will not be exposed to water and therefore not provide a tedium or location for the growth of pathogens, bacteria, biofilms, etc. The entirety of the bladder and filtration modular unit can then be replaced.

The presently disclosed invention, along with the multiple embodiments, is intended to be read specifically with the structure indicated in the various figures. Items redundant in many of the figures have not been repeatedly pointed out for the sake of a concise description. Structure indicated in the figures is intended to be illustrative and informative of the varied embodiments. It is contemplated that the present invention may be useful for treating fluids. Fluids is generally referring to liquids and gases that may be impacted by passing through a medium. Fluids can be defined as liquids, gases, or a mixture thereof. Treatment medium may be any of the three treatments methods described above, or may be useful to impart a characteristic, or impurity, or additional component to the fluid, and may include a screen, membrane, or material, etc. as is known in the art. Treatment medium may also be used to chemically, or otherwise react with the fluid to provide treatment and create a filtrate.

I claim:

1. A fluid treatment system with a replaceable fluid treatment assembly including entry/exit path for fluids to enter the fluid treatment system, pass through the treatment assembly, and then exit the system, said fluid treatment system comprising:
   a. a casing to house the treatment assembly, said casing comprising at least one aperture to allow ingress and/or egress of fluids relative to said casing;

b. said treatment assembly comprising a top end, and a bottom end opposing said top end, said treatment assembly further comprising a treatment medium and a bladder, said bladder adapted to contain the treatment medium; said bladder comprising at least one bladder aperture adapted to allow fluid ingress and egress relative said bladder;

c. a flow bypass endcap coupled to the treatment medium and said casing, wherein said bypass endcap comprises a central channel and a second outer channel situated around said central channel; and d. a ring along the top end of said treatment assembly, said ring immediately adjacent said bladder, and said ring immediately adjacent an interior surface of said casing.

2. The fluid treatment system of claim 1 wherein said casing comprises a second interior aperture concentric within said at least one aperture, wherein said at least one aperture is adapted to allow ingress of fluid into the system, while said second aperture is adapted to allow egress of fluid out of the system.

3. The fluid treatment system of claim 1, wherein said bladder further comprises a lower aperture.

4. The fluid treatment system of claim 3 further comprising a bottom endcap mated with said treatment medium and said casing through said bladder lower aperture.

5. The fluid treatment system of claim 1 wherein said casing further comprises an upper body and a lower body adapted to mate with one another to seal the treatment assembly within said casing.

6. The fluid treatment system of claim 5 further comprising a bottom endcap mated with said treatment medium and said casing lower body through a bladder lower aperture.

7. The fluid treatment system of claim 1 wherein said bladder is disposed between said bypass endcap and said casing.

8. The fluid treatment system of claim 7 further comprising a second ring adjacent an exterior surface of said endcap and adjacent an interior surface of said casing.

9. The fluid treatment system of claim 8 further comprising a third ring disposed between said flow bypass endcap and said casing.

10. The fluid treatment system of claim 1 wherein said second outer channel is isolated from said central channel.

11. The fluid treatment system of claim 10, wherein said bypass endcap further comprises at least one side channel, wherein said at least one side channel is adapted to allow fluid ingress into said bladder, and wherein said central channel is adapted to provide for fluid egress from said bladder following fluid flow through said treatment medium.

12. The fluid treatment system of claim 1 wherein said bypass endcap is coupled to a first end of the treatment medium, and a bottom endcap is coupled to a second end of the treatment medium.

13. The fluid treatment system of claim 12 wherein said bottom endcap is mated with said treatment medium and said casing through a bladder lower aperture.

14. The fluid treatment system of claim 1 wherein said at least one bladder aperture is concentric relative said at least one aperture.

15. The fluid treatment system of claim 1 wherein said ring comprises an O-ring.

16. A fluid treatment system with a replaceable fluid treatment assembly including entry/exit path for fluids to enter the fluid treatment system, pass through the treatment assembly, and then exit the system, said fluid treatment system comprising:

a. a casing to house the treatment assembly, said casing comprising at least one aperture to allow ingress and/or egress of fluids relative to said casing;

b. said treatment assembly comprising a top end, and a bottom end opposing said top end, said treatment assembly further comprising a treatment medium and a bladder, said bladder adapted to contain the treatment medium; said bladder comprising at least one bladder aperture adapted to allow fluid ingress and egress relative said bladder;

c. a flow bypass endcap coupled to the treatment medium and said casing;

d. said bladder disposed between said bypass endcap and said casing;

e. a ring along the top end of said treatment assembly, said ring immediately adjacent said bladder, and said ring immediately adjacent an interior surface of said casing;

f. a second ring adjacent an exterior surface of said endcap and adjacent an interior surface of said casing;

g. a third ring disposed between said flow bypass endcap and said casing.

17. The fluid treatment system of claim 16 wherein said bypass endcap comprises a central channel.

18. The fluid treatment system of claim 17 wherein said bypass endcap comprises a second outer channel situated around said central channel.

19. The fluid treatment system of claim 16 wherein said casing comprises a second interior aperture concentric within said at least one aperture, wherein said at least one aperture is adapted to allow ingress of fluid into the system, while said second aperture is adapted to allow egress of fluid out of the system.

20. The fluid treatment system of claim 16 wherein said bladder further comprises a lower aperture.

21. The fluid treatment system of claim 20 further comprising a bottom endcap mated with said treatment medium and said casing through said bladder lower aperture.

22. The fluid treatment system of claim 21 wherein said second outer channel is isolated from said central channel.

23. The fluid treatment system of claim 22 wherein said bypass endcap further comprises at least one side channel, wherein said at least one side channel is adapted to allow fluid ingress into said bladder, and wherein said central channel is adapted to provide for fluid egress from said bladder following fluid flow through said treatment medium.

24. The fluid treatment system of claim 16 wherein said casing further comprises an upper body and a lower body adapted to mate with one another to seal the treatment assembly within said casing.

25. The fluid treatment system of claim 24 further comprising a bottom endcap mated with said treatment medium and said casing lower body through a bladder lower aperture.

26. The fluid treatment system of claim 16 wherein said bypass endcap is coupled to a first end of the treatment medium, and a bottom endcap is coupled to a second end of the treatment medium.

27. The fluid treatment system of claim 26 wherein said bottom endcap is mated with said treatment medium and said casing through a bladder lower aperture.

28. The fluid treatment system of claim 16 wherein said at least one bladder aperture is concentric relative said at least one aperture.

29. The fluid treatment system of claim 16 wherein said ring comprises an O-ring.

* * * * *